US012585744B2

(12) United States Patent
Shen et al.

(10) Patent No.: US 12,585,744 B2
(45) Date of Patent: Mar. 24, 2026

(54) METHOD FOR PERFORMING BIOMETRIC FEATURE AUTHENTICATION WHEN MULTIPLE APPLICATION INTERFACES ARE SIMULTANEOUSLY DISPLAYED

(71) Applicant: Huawei Technologies Co., Ltd., Shenzhen (CN)

(72) Inventors: Zeyang Shen, Wuhan (CN); Kairong Wang, Shanghai (CN); Ning Kong, Shenzhen (CN); Meiling Luo, Shanghai (CN); Ming Ouyang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/044,928

(22) PCT Filed: Sep. 8, 2021

(86) PCT No.: PCT/CN2021/117294
§ 371 (c)(1),
(2) Date: Mar. 10, 2023

(87) PCT Pub. No.: WO2022/052961
PCT Pub. Date: Mar. 17, 2022

(65) Prior Publication Data
US 2024/0020367 A1 Jan. 18, 2024

(30) Foreign Application Priority Data
Sep. 10, 2020 (CN) .......................... 202010949841.2

(51) Int. Cl.
H04L 9/00 (2022.01)
G06F 21/32 (2013.01)
H04M 1/72463 (2021.01)

(52) U.S. Cl.
CPC ...... *G06F 21/32* (2013.01); *H04M 1/724634* (2022.02)

(58) Field of Classification Search
CPC .............. H04M 1/724634; G06F 21/32; G06F 2221/2147; H04L 63/10; H04L 64/14; H04W 12/00; H04W 12/06
(Continued)

(56) References Cited

U.S. PATENT DOCUMENTS 9,374,361 B2 * 6/2016 Khalil ................. H04L 63/0815
11,765,163 B2 * 9/2023 Van Os ................. G06F 3/0488
340/5.83
(Continued)

FOREIGN PATENT DOCUMENTS

CN 104052873 A 9/2014
CN 106384039 A 2/2017
(Continued)

*Primary Examiner* — Josnel Jeudy
(74) *Attorney, Agent, or Firm* — Conley Rose, P.C.

(57) ABSTRACT

A display method includes simultaneously running a locked first application and a locked second application on the electronic device; first displaying a first authentication interface and a second authentication interface, where the first authentication interface and the second authentication interface are simultaneously displayed; obtaining first biometric authentication information of a user by using a system authentication service by obtaining fingerprint information of the user; and displaying a first application interface in response to successful authentication on the first biometric authentication information, where the first application interface includes content displayed by the first application after authentication on the first biometric authentication information succeeds.

21 Claims, 30 Drawing Sheets

(58) Field of Classification Search
    USPC ......................................................... 713/186
    See application file for complete search history.

(56)              References Cited

U.S. PATENT DOCUMENTS

| | | | |
|---|---|---|---|
| 2016/0283710 A1 | 9/2016 | Kwon et al. | |
| 2017/0244703 A1 | 8/2017 | Lee et al. | |
| 2018/0203601 A1 | 7/2018 | Birchfield et al. | |
| 2018/0227128 A1* | 8/2018 | Church | H04L 9/3247 |
| 2019/0370583 A1* | 12/2019 | Van Os | G06V 10/98 |

FOREIGN PATENT DOCUMENTS

| | | | |
|---|---|---|---|
| CN | 107193471 A | 9/2017 | |
| CN | 107229411 A | 10/2017 | |
| CN | 109325337 A | 2/2019 | |
| CN | 110210195 A | 9/2019 | |
| CN | 110730267 A | 1/2020 | |
| CN | 110995917 A | 4/2020 | |
| CN | 111274564 A | 6/2020 | |
| WO | 2019227488 A1 | 12/2019 | |

* cited by examiner (1)                                          (2)

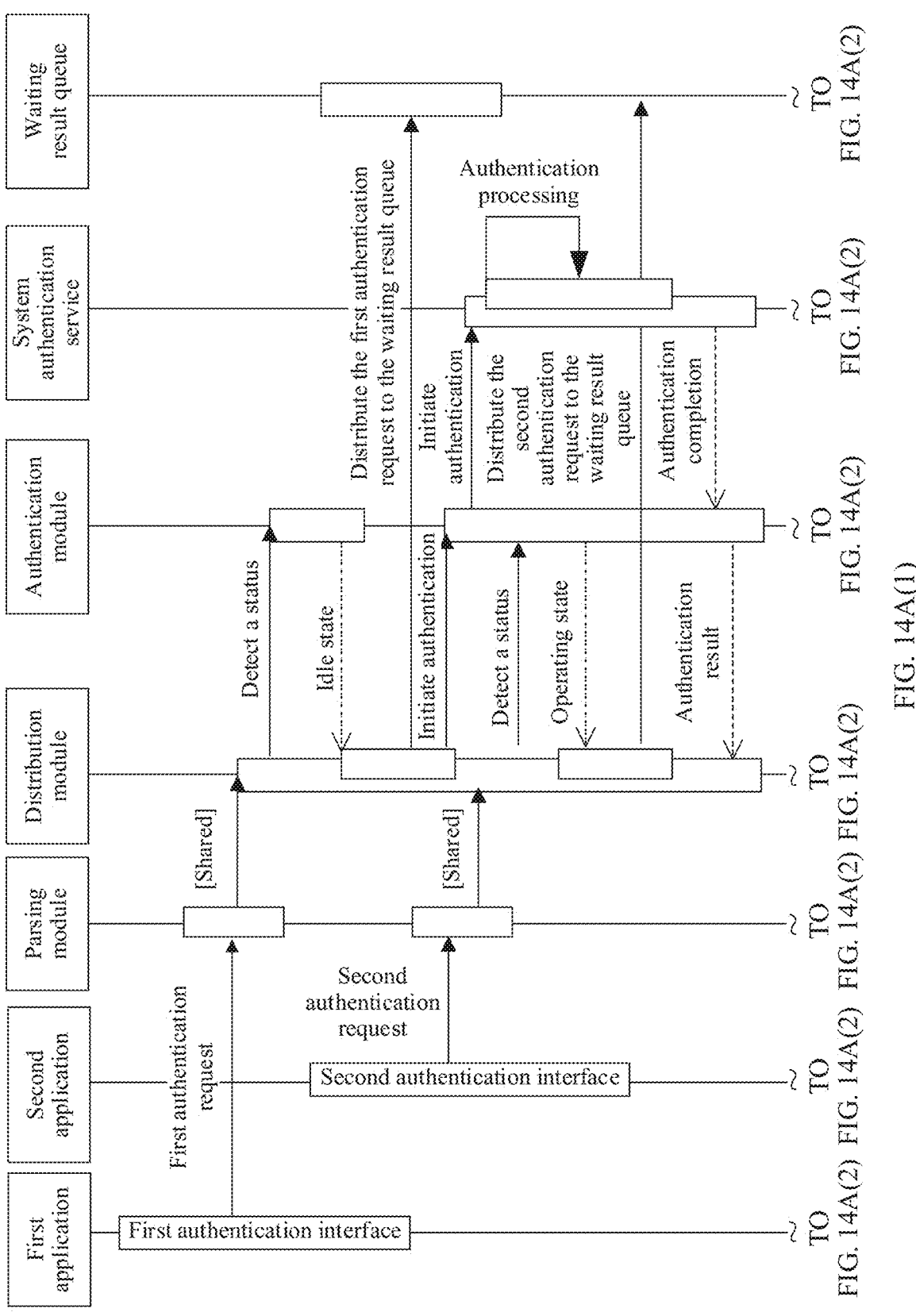
FIG. 14A(1)

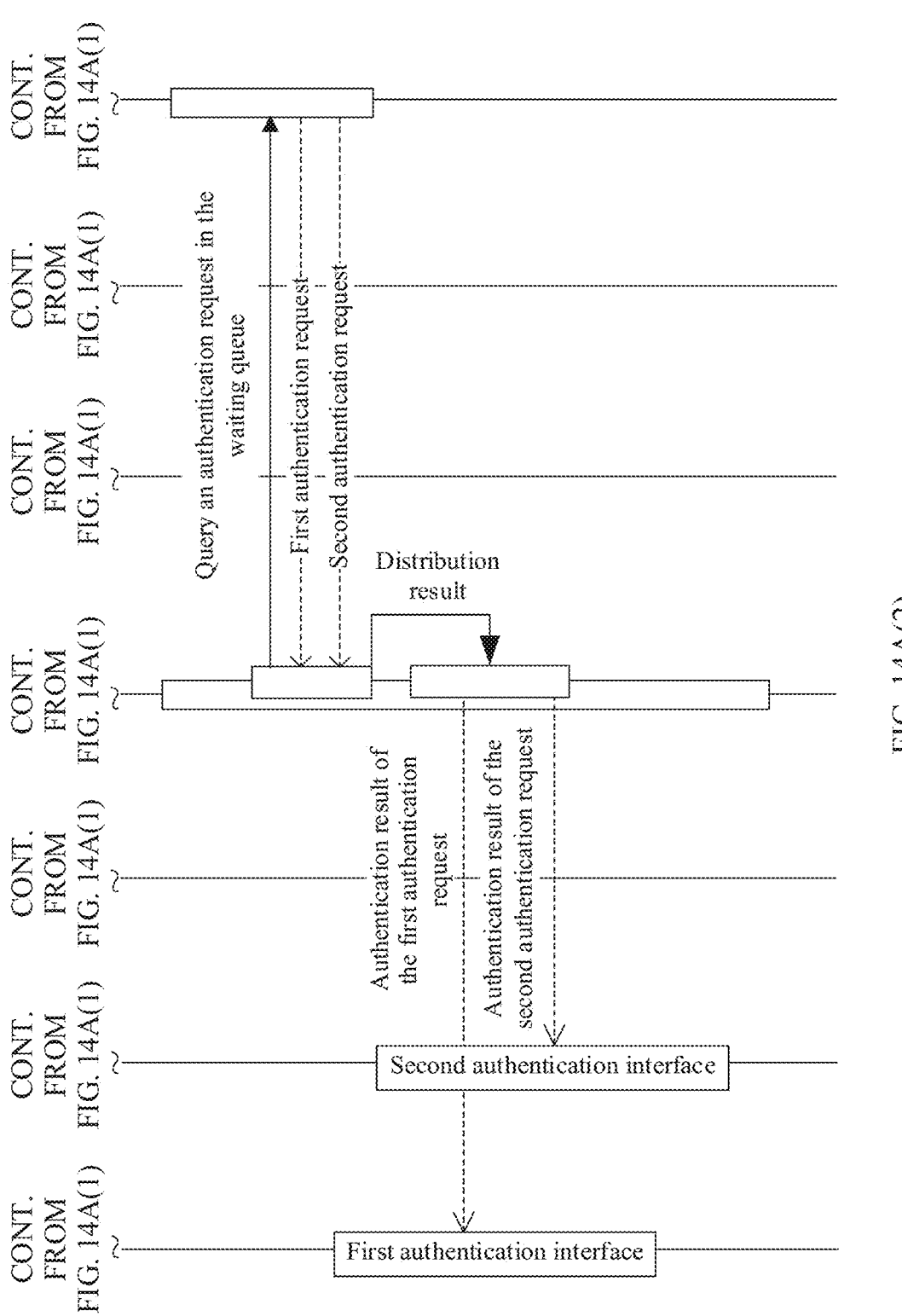
FIG. 14A(2)

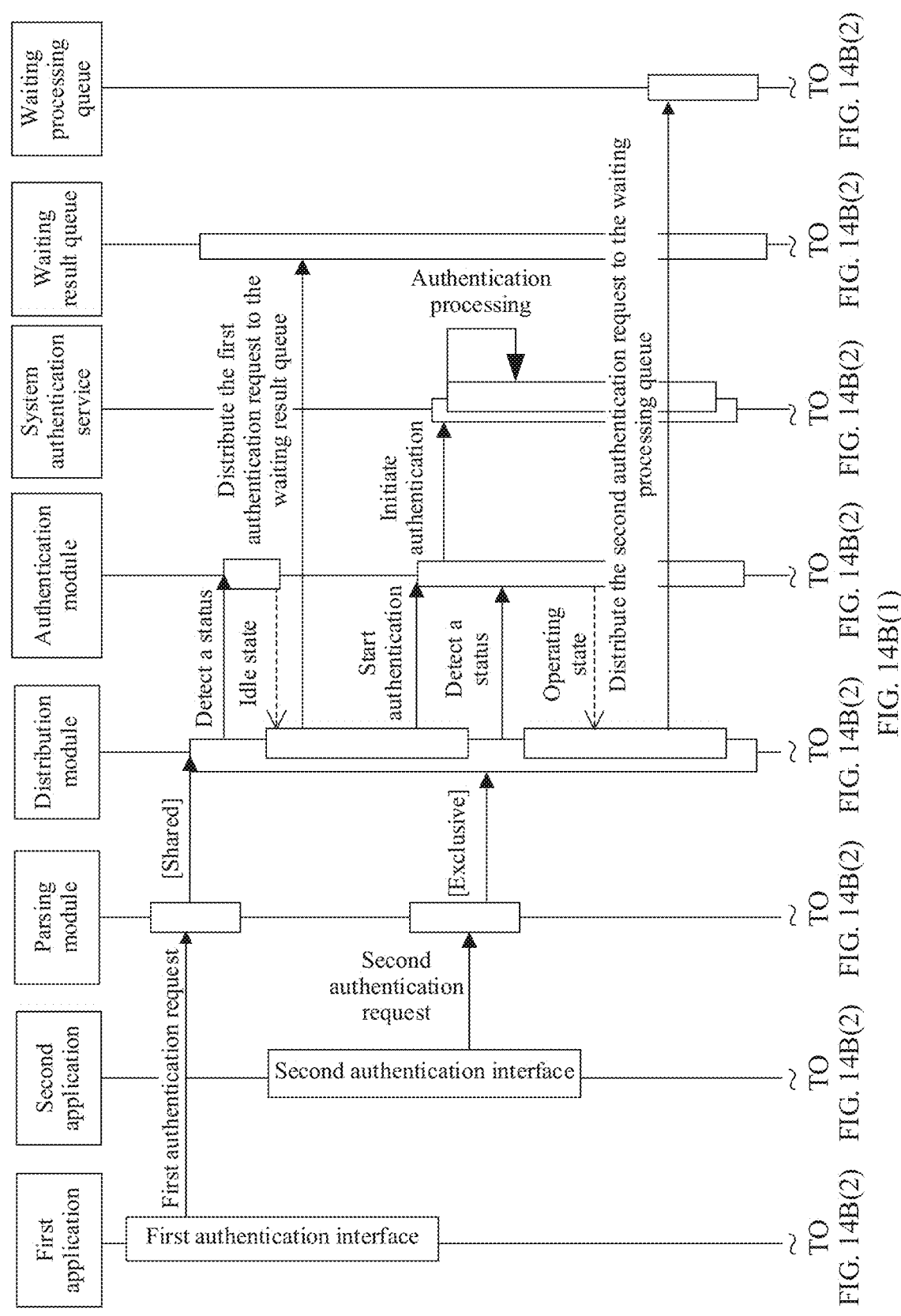
FIG. 14B(1)

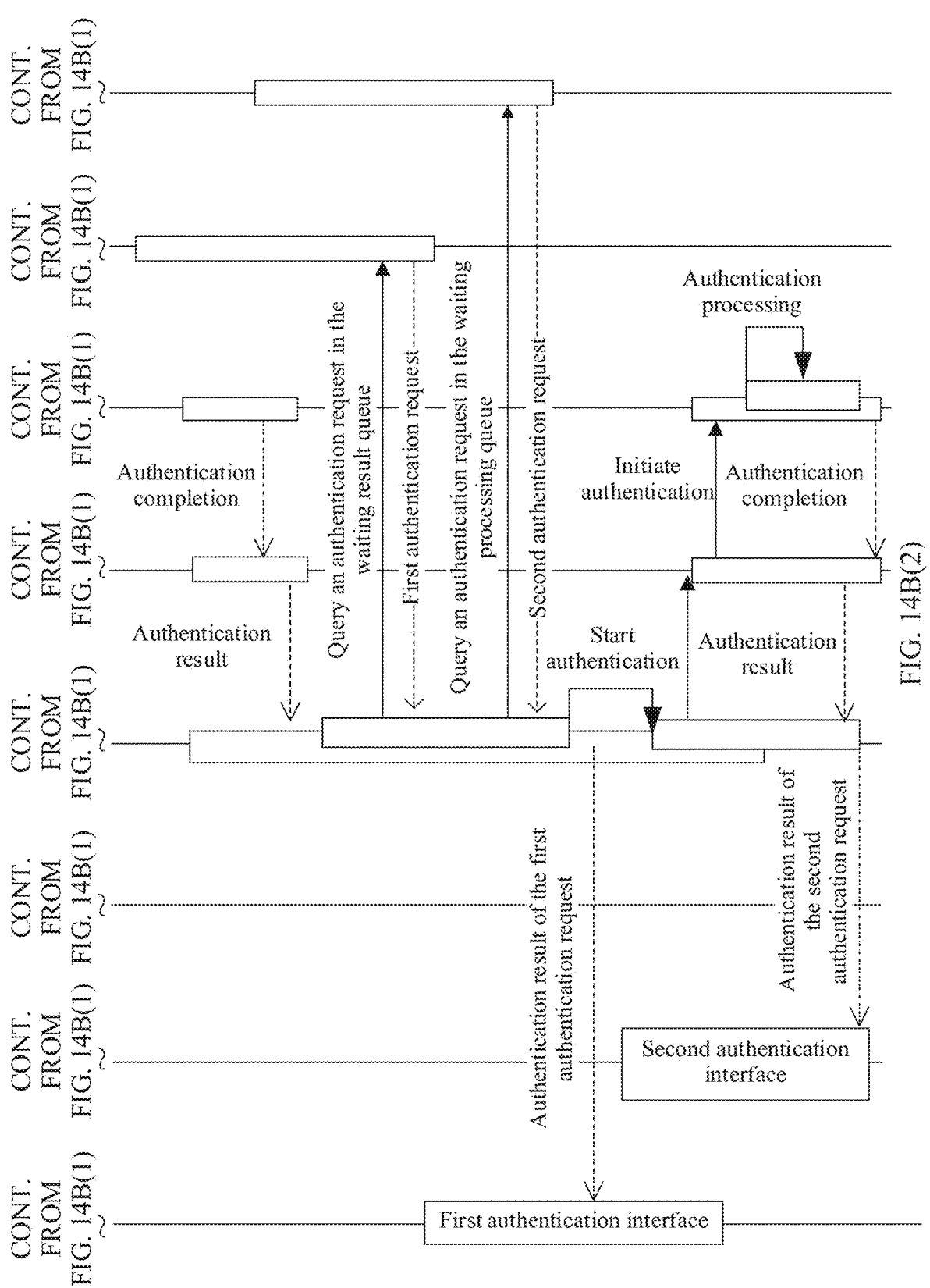
FIG. 14B(2)

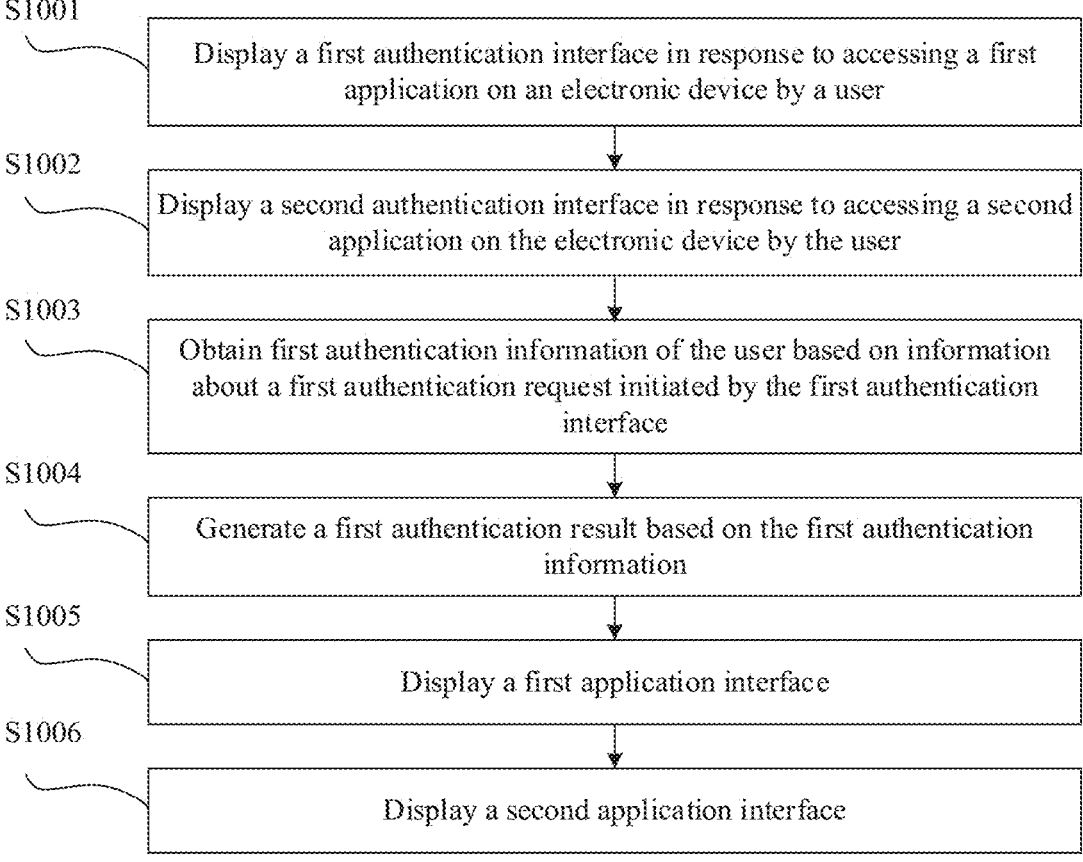

S1001

Display a first authentication interface in response to accessing a first application on an electronic device by a user

S1002

Display a second authentication interface in response to accessing a second application on the electronic device by the user

S1003

Obtain first authentication information of the user based on information about a first authentication request initiated by the first authentication interface

S1004

Generate a first authentication result based on the first authentication information

S1005

Display a first application interface

S1006

Display a second application interface

FIG. 15

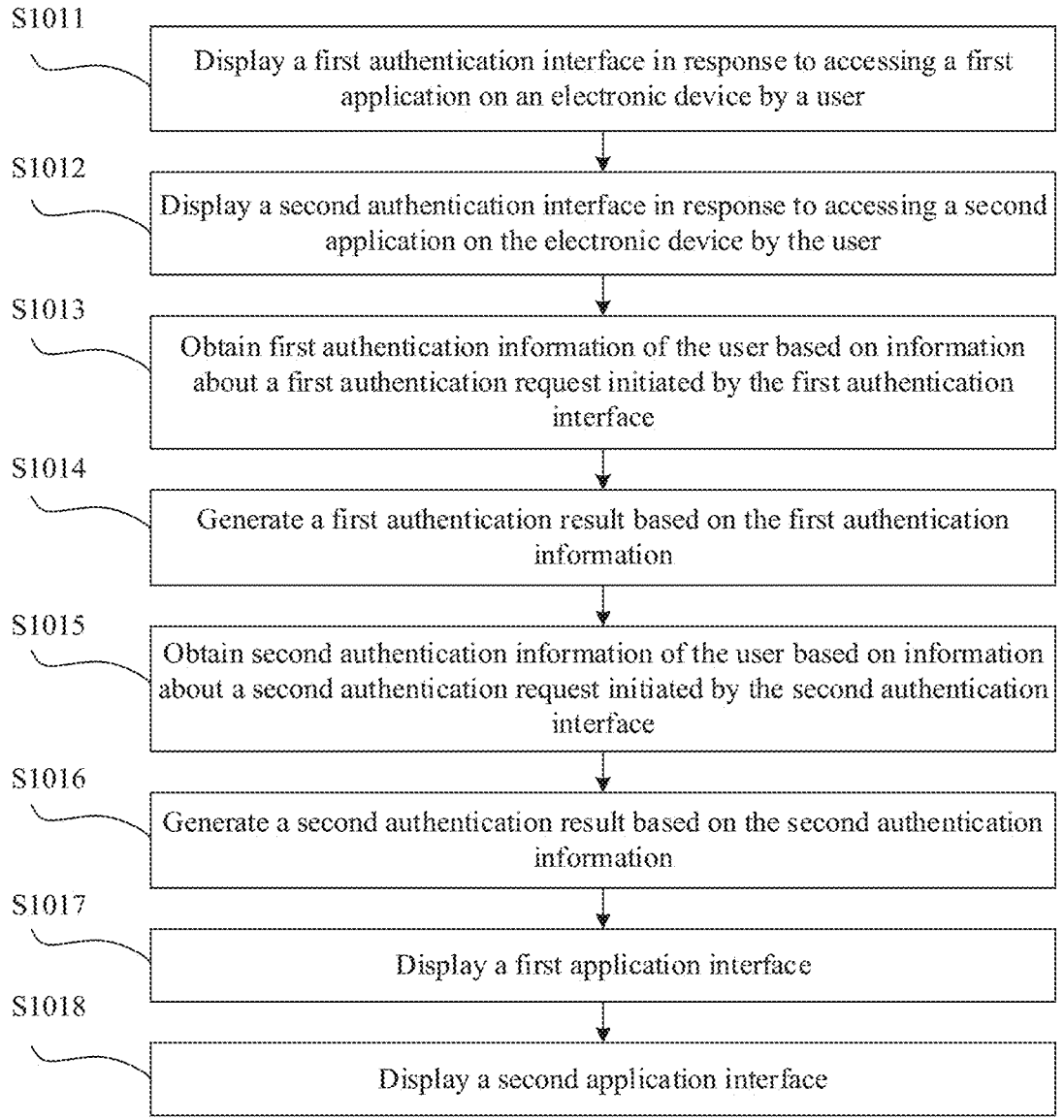

S1011

Display a first authentication interface in response to accessing a first application on an electronic device by a user

S1012

Display a second authentication interface in response to accessing a second application on the electronic device by the user

S1013

Obtain first authentication information of the user based on information about a first authentication request initiated by the first authentication interface

S1014

Generate a first authentication result based on the first authentication information

S1015

Obtain second authentication information of the user based on information about a second authentication request initiated by the second authentication interface

S1016

Generate a second authentication result based on the second authentication information

S1017

Display a first application interface

S1018

Display a second application interface

METHOD FOR PERFORMING BIOMETRIC FEATURE AUTHENTICATION WHEN MULTIPLE APPLICATION INTERFACES ARE SIMULTANEOUSLY DISPLAYED

CROSS-REFERENCE TO RELATED APPLICATIONS

This is a National Stage of International Patent Application No. PCT/CN2021/117294, filed on Sep. 8, 2021, which claims priority to Chinese Patent Application No. 202010949841.2, filed on Sep. 10, 2020. Both of the aforementioned applications are hereby incorporated by reference in their entireties.

TECHNICAL FIELD

This application relates to the field of electronic technologies, and in particular, to a display method applied to an electronic device and an electronic device.

BACKGROUND

With rapid development of science and technology, terminal devices having a touchscreen, such as a mobile phone or a tablet computer, are widely applied. A user may use the terminal devices to perform various activities such as communication or entertainment.

In a process in which the user uses a terminal device, some personal information is stored in the terminal device, and the personal information is private to the user. However, in some cases, the terminal device is used by a plurality of different users in turn. As a result, a current user may view personal information of a previous user, and the personal information of the user is disclosed. As people attach increasing importance to information security, biometric feature-based identity recognition technologies such as fingerprint recognition, face recognition, or iris recognition have developed rapidly.

SUMMARY

This application provides a display method applied to an electronic device and an electronic device, so that the electronic device can perform biometric feature authentication when simultaneously displaying a plurality of authentication interfaces. This not only improves human-computer interaction efficiency, but also ensures security of personal information of a user.

According to a first aspect, a display method applied to an electronic device is provided. The method includes:

displaying a first authentication interface in response to accessing a first application on the electronic device by a user, where the first authentication interface indicates the user to perform biometric feature authentication; displaying a second authentication interface in response to accessing a second application on the electronic device by the user, where the second authentication interface indicates the user to perform biometric feature authentication, and the first authentication interface and the second authentication interface are simultaneously displayed; obtaining first biometric authentication information of the user; and displaying a first application interface in response to successful authentication on the first biometric authentication information, where the first application interface includes content displayed by the first application after authentication on the first biometric authentication information succeeds.

Therefore, according to the implementation solution of this application, the electronic device can not only process separately initiated authentication requests, but also process concurrent authentication requests. In this way, the electronic device can display, in response to accessing more than one locked application by the user, an authentication interface corresponding to a locked application, then obtain authentication information of the user to generate an authentication result, and display an unlocked application interface. The concurrent authentication requests may indicate that a plurality of authentication requests use a same authentication result, so that power consumption of the electronic device is reduced. Alternatively, the concurrent authentication requests may indicate that authentication requests are stored in a queue, and authentication is initiated in an orderly manner based on the authentication requests after a system authentication service is in an idle state. An unlocked application interface is displayed after the authentication succeeds. This not only improves human-computer interaction efficiency, but also ensures security of personal information of the user.

With reference to the first aspect, in a possible implementation of the first aspect, the first authentication interface and the second authentication interface are interfaces displayed on the electronic device in a split-screen mode.

With reference to the first aspect, in a possible implementation of the first aspect, the first authentication interface is located in a first display area of the electronic device, and the second authentication interface is located in a second display area of the electronic device.

With reference to the first aspect, in a possible implementation of the first aspect, the first authentication interface includes a first control; and the electronic device enables a system authentication service in response to a user input acting on the first control.

With reference to the first aspect, in a possible implementation of the first aspect, after authentication on the first biometric authentication information succeeds, the method further includes: displaying a second application interface, where the second application interface includes content displayed by the second application after authentication on the first biometric authentication information succeeds.

With reference to the first aspect, in a possible implementation of the first aspect, the method further includes: obtaining second biometric authentication information of the user; and displaying a second application interface in response to successful authentication on the second biometric authentication information, where the second application interface includes content displayed by the second application after authentication on the second biometric authentication information succeeds.

With reference to the first aspect, in a possible implementation of the first aspect, a biometric feature authentication type of the first biometric authentication information is the same as that of the second biometric authentication information.

With reference to the first aspect, in a possible implementation of the first aspect, both the first application and the second application are locked applications.

With reference to the first aspect, in a possible implementation of the first aspect, the first biometric authentication information is fingerprint information, face information, iris information, or voiceprint information.

With reference to the first aspect, in a possible implementation of the first aspect, the second biometric authentication information is fingerprint information, face information, iris information, or voiceprint information.

With reference to the first aspect, in a possible implementation of the first aspect, the obtaining first biometric authentication information of the user specifically includes: obtaining the first biometric authentication information of the user through another electronic device, where there is a communication connection relationship between the another electronic device and the electronic device.

According to a second aspect, this application provides an electronic device. The electronic device includes a memory and one or more processors, where the memory is configured to store computer program code, the computer program code includes computer instructions, and when the computer instructions are executed by the processors, the electronic device is enabled to perform the display method applied to the electronic device according to any one of claims 1 to 11.

According to a third aspect, this application provides a computer-readable storage medium. The computer-readable storage medium includes computer instructions, and when the computer instructions are run on an electronic device, the electronic device is enabled to perform the display method applied to the electronic device according to any one of claims 1 to 11.

According to a fourth aspect, this application provides a computer program product. When the computer program product runs on a computer, the computer is enabled to perform the display method applied to the electronic device according to any one of claims 1 to 11.

BRIEF DESCRIPTION OF DRAWINGS

FIG. 14A(1) and FIG. 14A(2) and FIG. 14B(1) and FIG. 14B(2) are a set of sequence diagrams according to an embodiment of this application;

FIG. 15 is a flowchart of a method according to an embodiment of this application; and FIG. 16 is a flowchart of another method according to an embodiment of this application.

DESCRIPTION OF EMBODIMENTS

Figure 1:
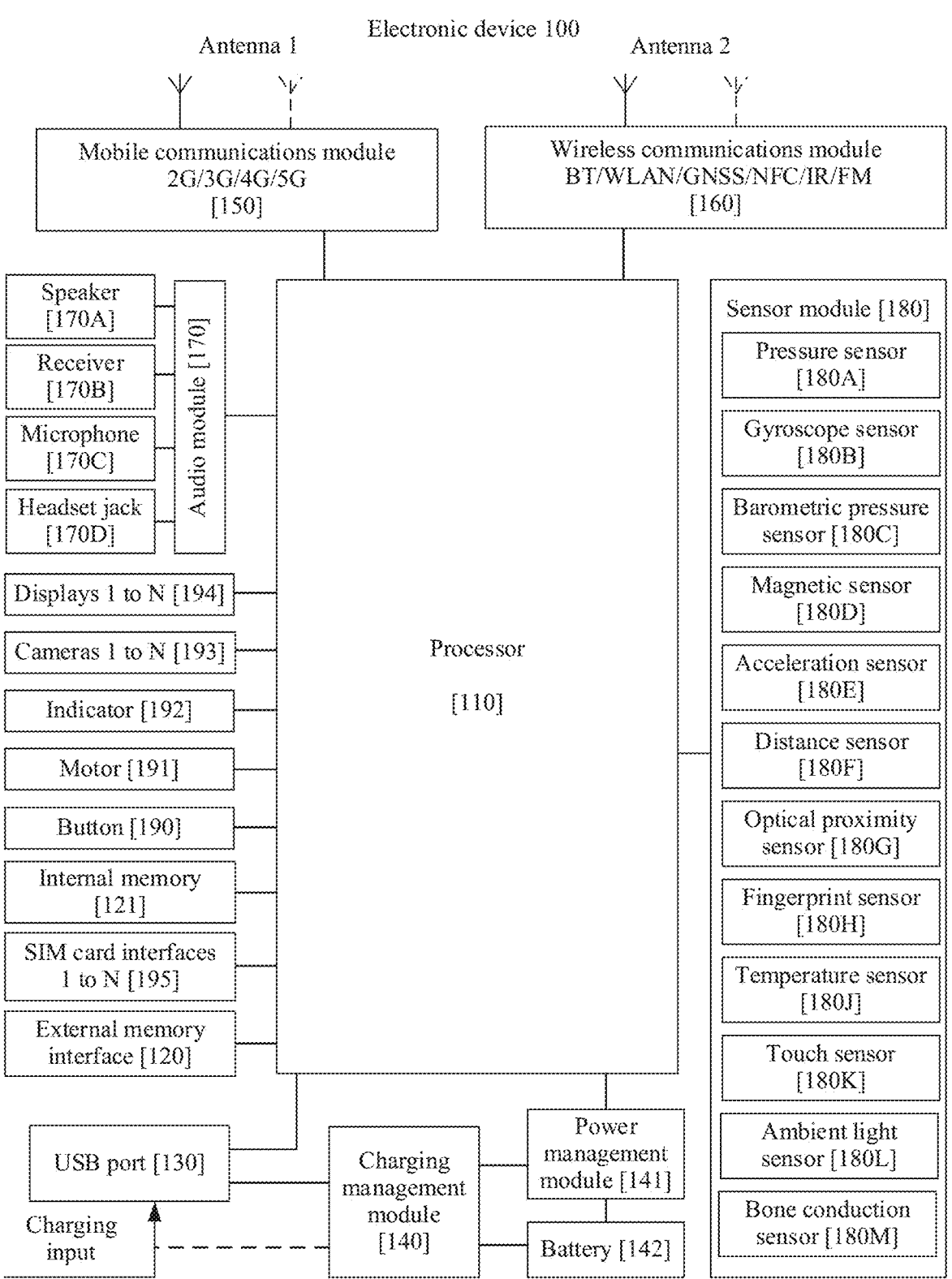
FIG. 1 is a diagram of a hardware architecture of an electronic device 100 according to an embodiment of this application.

The following clearly describes technical solutions in embodiments of this application in detail with reference to the accompanying drawings. In the descriptions of embodiments of this application, unless otherwise specified, "/" indicates "or". For example, A/B may indicate A or B. The term "or" in this specification merely describes an association relationship for describing associated objects, and indicates that three relationships may exist. For example, A or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

A term "user interface (user interface, UI)" in this specification, the claims, and the accompanying drawings of this application is a medium interface for interaction and information exchange between a user and an application or an operating system, and the interface implements conversion between an internal form of information and a form that can be accepted by the user. A user interface of an application is source code written by using a specific computer language such as Java or an extensible markup language (extensible markup language, XML). The interface source code is parsed and rendered on a terminal device, and finally is presented as content that can be identified by a user, such as a picture control, a text control, or a button control. The control (control), also referred to as a widget (widget), is a basic element on the user interface. Typical controls include a toolbar (toolbar), a menu bar (menu bar), a text box (text box), a button (button), a scrollbar (scrollbar), a picture, and a text. An attribute and content of a control on an interface are defined by using a tag or a node. For example, the control included in the interface is defined in the XML by using a node, for example, <Textview>, <ImgView>, or <VideoView>. One node corresponds to one control or one attribute on the interface. After being parsed and rendered, the node is presented as user-visible content. In addition, interfaces of many applications such as a hybrid application (hybrid application) usually further include a web page. The web page, also referred to as a page, may be understood as a special control embedded in an application interface. The web page is source code written in a specific computer language, for example, hyper text markup language (hyper text markup language, HTML), a cascading style sheet (cascading style sheets, CSS), or JavaScript (JavaScript, JS). The web page source code may be loaded and displayed as user-recognizable content by a browser or a web page display component having a function similar to that of the browser. Specific content included in the web page is also defined by using a tag or a node in the web page source code. For example, an element and an attribute of the web page are defined in the HTML by using <p>, <img>, <video>, or <canvas>.

The user interface is usually represented in a form of a graphical user interface (graphic user interface, GUI), and the graphical user interface is a user interface that is related to a computer operation and that is displayed in a graphical manner. The graphical user interface may be an interface element such as an icon, a window, or a control displayed on a display of an electronic device, where the control may include a visual interface element such as an icon, a button, a menu, a tab, a text box, a dialog box, a status bar, a navigation bar, or a widget.

The following describes an electronic device, a graphical user interface used for the electronic device, and embodiments used for using the electronic device. In some embodiments, the electronic device may be a portable electronic device that further includes other functions such as a personal digital assistant function and/or a music player function, for example, a mobile phone, a tablet computer, or a wearable electronic device having a wireless communication function (for example, a smartwatch). An example embodiment of the portable electronic device includes but is not limited to a portable electronic device using iOS®, Android®, Microsoft®, or another operating system. The portable electronic device may alternatively be another portable electronic device, for example, a laptop (Laptop) computer having a touch-sensitive surface or a touch panel. It should be further understood that, in some other embodiments, the electronic device may alternatively not be a portable electronic device, but is a desktop computer having a touch-sensitive surface or a touch panel.

An application program (Application Program) or application software (Application Software) in embodiments of this application, referred to as an application (App) for short, is a computer program that can implement one or more specific functions. Generally, a plurality of applications may be installed in the terminal device, for example, a camera application, a messaging application, a multimedia messaging application, various email applications, WeChat®, QQ®, WhatsApp Messenger®, Facebook®, and DingTalk®. The application mentioned below may be an application built in the terminal before delivery, or may be an application downloaded by a user from a network side in a process of using the terminal.

The locked application mentioned in embodiments of this application is an application that needs to pass identity authentication when the application is started or used. For example, a biometric feature such as a fingerprint, a face, or an iris of the user needs to be authenticated, or the user is required to enter a password, and then an application can be used only after authentication succeeds, or account login and payment confirmation can be performed in an application only after authentication succeeds. The function may be implemented at a system service layer by shielding a use interface of the application by using an unlocking authentication interface, or implemented by preventing the application from being started when verification fails. This is not limited in embodiments of the present invention. The function may also have different names in different operating systems, for example, "application lock" or "privacy application".

The following describes a hardware architecture of the electronic device mentioned in embodiments of this application.

FIG. 1 is a schematic diagram of a structure of an electronic device 100.

The electronic device 100 is used as an example below to describe embodiments in detail. A device type of the electronic device 100 may include a mobile phone, a television, a tablet computer, a speaker, a watch, a desktop computer, a laptop computer, a handheld computer, a notebook computer, an ultra-mobile personal computer (ultra-mobile personal computer, UMPC), a netbook, a personal digital assistant (personal digital assistant, PDA), an augmented reality (augmented reality, AR)/virtual reality (virtual reality, VR) device, or the like. A device type of the electronic device 100 is not specifically limited in embodiments of this application.

Figure 2:
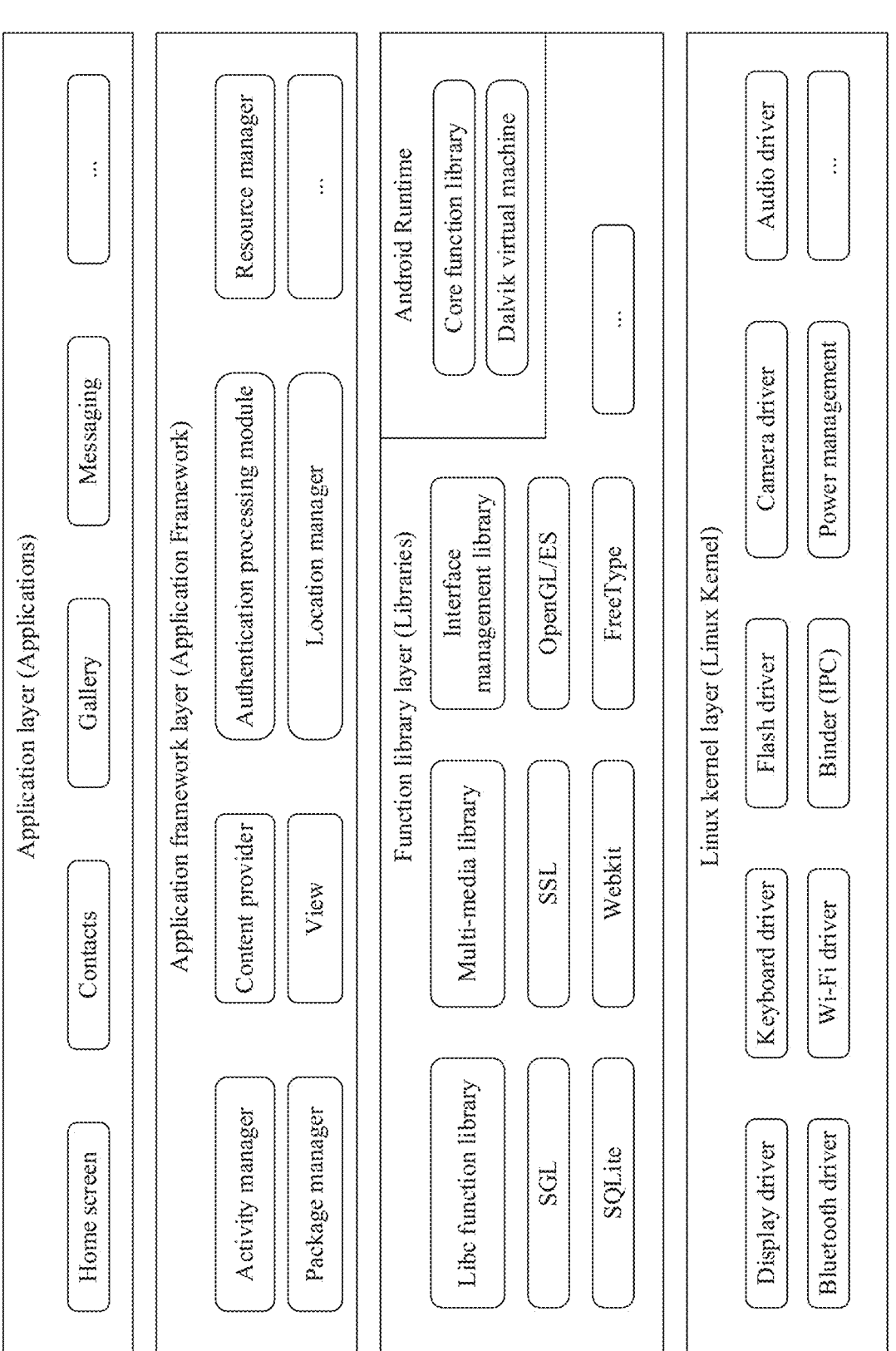
FIG. 2 is a block diagram of a software structure of an electronic device 100 according to an embodiment of this application.

It should be understood that the electronic device 100 shown in FIG. 1 is merely an example, and the electronic device 100 may have more or fewer components than those shown in FIG. 2, or may combine two or more components, or may have different component configurations. Components shown in the figure may be implemented by hardware including one or more signal processing and/or application-specific integrated circuits, software, or a combination of hardware and software.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180W, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store an instruction or data that has just been used or is cyclically used by the processor 110. If the processor 110 needs to use the instruction or the data again, the processor may directly invoke the instruction or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like.

A wireless communication function of the electronic device 100 may be implemented through the antenna 1, the antenna 2, the mobile communications module 150, the wireless communications module 160, the modem processor, the baseband processor, and the like.

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In embodiments of the present invention, the camera 193 includes a camera that captures an image required for face recognition, for example, an infrared camera or another camera. The camera that captures an image required for face recognition is usually located at the front of the electronic device, for example, above a touchscreen, or may be located at another position. This is not limited in embodiments of the present invention. In some embodiments, the electronic device 100 may include another camera. The electronic device may further include a dot matrix transmitter (which is not shown in the figure) that is configured to emit light. The camera collects light reflected by a face to obtain a face image. The processor processes and analyzes the face image, and compares the face image with stored face image information for verification.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, by referring to a transfer mode between human brain neurons, and may further perform self-learning continuously. Applications such as intelligent cognition of the electronic device 100, for example, image recognition, face recognition, speech recognition, and text understanding, may be implemented through the NPU.

The external memory interface 120 may be used to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 executes various function applications and data processing of the electronic device 100 by running the instructions stored in the internal memory 121. The internal memory 121 may include a program storage area and a data storage area. The program storage area may store an operating system, an application (for example, a face recognition function, a fingerprint recognition function, and a mobile payment function) required by at least one function, and the like. The data storage area may store data (for example, facial information template data and a fingerprint information template) and the like created during use of the electronic device 100. In addition, the internal memory 121 may include a high-speed random access memory, or may include a non-volatile memory such as at least one magnetic disk memory, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal.

The speaker 170A, also referred to as a "loudspeaker", is configured to convert an audio electrical signal into a sound signal.

The receiver 170B, also referred to as an "earpiece", is configured to convert an audio electrical signal into a sound signal.

The microphone 170C, also referred to as a "mike" or a "mic", is configured to convert a sound signal into an electrical signal.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor.

The gyroscope sensor 180B may be configured to determine a motion posture of the electronic device 100. In some embodiments, an angular velocity of the electronic device 100 around three axes (that is, x, y, and z axes) may be determined through the gyroscope sensor 180B.

The optical proximity sensor 180G may include a light-emitting diode (LED) and an optical detector, for example, a photodiode. The light-emitting diode may be an infrared light-emitting diode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The fingerprint sensor 180H may be disposed below the touchscreen. The electronic device 100 may receive a touch operation of a user in an area corresponding to the fingerprint sensor on the touchscreen. The electronic device 100 may collect fingerprint information of a finger of the user in response to the touch operation, to implement opening of a hidden album after fingerprint recognition succeeds, starting of a hidden application after fingerprint recognition succeeds, account login after fingerprint recognition succeeds, payment after fingerprint recognition succeeds, and the like described in embodiments of this application.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the electronic device 100 at a location different from a location of the display 194.

The button 190 includes a power-on button, a volume button, and the like. The button 190 may be a mechanical button, or may be a touch-sensitive button. The electronic device 100 may receive a button input, and generate a button signal input related to user settings and function control of the electronic device 100.

The indicator 192 may be an indicator light, and may be configured to indicate a charging status and a power change, or may be configured to indicate a message, a missed call, a notification, or the like.

The SIM card interface 195 is configured to connect to a SIM card. The SIM card may be inserted into the SIM card interface 195 or removed from the SIM card interface 195, to implement contact with or separation from the electronic device 100. In some embodiments, the electronic device 100 uses an eSIM, that is, an embedded SIM card. The eSIM card may be embedded into the electronic device 100, and cannot be separated from the electronic device 100.

A software system of the electronic device 100 may use a layered architecture, an event-driven architecture, a micro-kernel architecture, a microservice architecture, or a cloud architecture. In this embodiment of the present invention, an Android system of a layered architecture is used as an example to illustrate a software structure of the electronic device 100.

FIG. 2 is a schematic diagram of a structure of an operating system of a mobile phone that runs an Android operating system. An architecture of the Android operating system is classified into four layers: an application layer, an application framework layer, a function library layer, and a Linux kernel layer from top to bottom 1. Application Layer:

The application layer (Applications) is the uppermost layer of the architecture of the Android operating system, and includes core application software assembled in the Android operating system, for example, email client, Messaging, Phone, Calendar, Maps, Browser, and Contacts. Certainly, a developer may compile an application and install the application at the layer. Generally, an application is developed in Java language, and this is completed by invoking an API (Application Programming Interface) provided by the application framework layer.

2. Application Framework Layer:

The application framework layer (Application Framework) mainly provides various APIs that can be used by the developer to access an application. The developer interacts with an Android lower layer (for example, the function library layer or the Linux kernel layer) by using the application framework layer, to develop an own application. The application framework layer mainly includes a series of services and management systems of the Android operating system. The application framework layer mainly includes the following key services:

an activity manager (Activity Manager), used to manage a lifecycle of an application and provide a commonly-used navigation back function;

a content provider (Content Providers), used to manage data sharing and access between different applications;

an authentication processing module (Authenticator Dealer), configured to process an authentication request initiated by an authentication interface and invokes a corresponding system authentication service;

a resource manager (Resource Manager) that provides non-code resources (for example, a character string, a graphic, a layout file (Layout file), and the like) for an application for use;

a package manager (Package Manager) that mainly manages an application of the Android operating system;

a view (View) that has abundant and extensible view sets, is used to construct an application, and specifically includes a list (List), a grid (Grid), a text box (Text Box), a button (Button), and an embeddable web browser; and a location manager (Location Manager) that mainly enables an application to access a current geographical location of a mobile phone.

3. Function Library Layer:

The function library layer (Libraries) is a support of the application framework, and is an important link between the application framework layer and the Linux kernel layer. The function library layer includes some function libraries compiled by using a computer programming language C or C++. These function libraries can be used by different components in the Android operating system, and provide a service for the developer by using the Android application framework. Specifically, the function library includes a libc function library, and the libc function library is specially customized for a device based on embedded Linux. The function library further includes a multi-media library (Media Framework) of the Android operating system, and the library supports playback and recording of audio/videos in a plurality of encoding formats, and supports a still image file and a common audio/video encoding format. The function library further includes an interface management library (Surface Manager). The interface management library is mainly responsible for managing access to a display system, is specifically used to be responsible for managing interaction between a display operation and an access operation when a plurality of applications are executed, and is further responsible for display composition of a 2D drawing and a 3D drawing.

The function library layer further includes another function library used to implement various functions of a mobile phone with the Android operating system, for example, an SGL (Scalable Graphics Library): a 2D graphics and image processing engine based on an XML (Extensible Markup Language) file, an SSL (Secure Sockets Layer) that is located between TVP/IP (Transmission Control Protocol/Internet Protocol, transmission control protocol/internet protocol) and various application layer protocols and that supports data communication; OpenGL/ES: 3D effect support: SQLite: a relational database engine; Webkit: a web browser engine; or FreeType: bitmap (Bitmap) and vector (Vector) font support.

Android Runtime is a running environment in the Android operating system, and is a new virtual machine used in the Android operating system. An AOT (Ahead-Of-Time) technology is used in the Android Runtime. When an application is installed for the first time, bytecode of the application is pre-compiled into machine code, to make the application a real local application. Then, when the application runs again, a compilation step is omitted, so that the application is started and executed more quickly.

In some other cases, the Android Runtime may also be replaced by a core function library (Core Libraries) and a Dalvik virtual machine (Dalvik Virtual Machine). The core function library provides most functions of an API (Application Programming Interface) in the Java language, and provides an interface for the application framework layer in a JNI (Java Native Interface) manner to invoke a lower application library. In addition, the core function library also includes some core APIs of Android, such as android.os, android.net, and android.media. The Dalvik virtual machine uses a JIT (Just-in-Time) runtime compilation mechanism. The virtual machine needs to recompile bytecode on the background each time a process is started, and this affects a starting speed. Each Android application runs in one instance in the Dalvik virtual machine, and each Dalvik virtual machine instance is an independent process space. The Dalvik virtual machine is designed to enable a plurality of virtual machines to run in one device efficiently. The Dalvik virtual machine may execute a file format .dex. The dex format is a compression format specially designed for Dalvik, and is suitable for a system having a limited memory and a processor with a limited speed. It should be noted that the Dalvik virtual machine depends on the Linux kernel to provide a basic function (thread and lower-layer memory management). It may be understood that Android Runtime and Dalvik belong to different types of virtual machines, and a person skilled in the art may select different forms of virtual machines in different cases.

4. Linux Kernel Layer:

Android core system services such as security, memory management, process management, a network protocol stack, and a driver model are based on a Linux kernel. The Linux kernel is also used as an abstraction layer between hardware and software stacks. The layer has many driver programs related to a mobile device, and main drivers include: a display driver (Display Driver), which is a frame buffer (Frame Buffer) driver based on Linux; a keyboard driver (KeyBoard Driver), which is a keyboard driver as an input device; a flash driver (Flash Memory Driver), which is a flash driver program based on an MTD (memory technology device, memory technology device); a camera driver (Camera Driver), which is a commonly-used v4l2 (Video for Linux) based on Linux; an audio driver (Audio Driver), which is a commonly-used advanced Linux sound system driver based on an ALSA (Advanced Linux Sound Architecture): a Bluetooth driver (Bluetooth Driver), which is a radio transmission technology based on an IEEE 802.15.1 standard; a Wi-Fi driver (Wi-Fi Drive), which is a driver program based on an IEEE 802.11 standard: a Binder (IPC) driver, which is a special Android driver program, has a separate device node, and provides a function of communication between processes; and power management (Power Management), such as a battery level.

In the Android system, a WMS (Window Manager Service) at the application framework layer can be used to manage all windows, including creating, deleting, and modifying windows, as well as sizes, levels, and focus positions of the windows. In a specific implementation in which an application adds or deletes a window in an activity, the application invokes addView( ) and removeView( ) functions of a WindowManager class for completion, invokes related methods of a ViewRoot class, and then invokes related methods in the WMS by using the IPC to complete the adding and deletion processes.

WindowManager. LayoutParams is a nested class of a WindowManager interface. The WindowManager. LayoutParams is inherited from ViewGroup. LayoutParams, and is used to describe a management policy of a window to WindowManager. Attribute parameters (layoutParams) of the window may include a type (window type) and a flag (parameter for processing the window). A type (type) of the window may be classified into an application window, a system window, and a sub window. When a process applies for a window from the WMS, a system needs to be notified of a type of the window. For window display, a higher level of the window indicates that the window is displayed in a more front location. Common flags of the window include: FLAG_KEEP_SCREEN_ON, which indicates that a screen is steady on: FLAG_SHOW_WHEN_LOCKED, which indicates that the page is displayed when a screen is locked: FLAG_DISMISS_KEYGUARD, which indicates that a screen is unlocked without a password; FLAG_TURN_SCREEN_ON, which indicates turning on a screen; FLAG_FULLSCREEN, which indicates displaying in full screen without a status bar: FLAG_SECURE, which indicates that the window cannot be captured, FLAG_SCALED, which indicates adjusting the window based on a user requirement; FLAG_DIM_BEHIND, which indicates that things behind the window is to become dim: and the like.

Figure 3A:
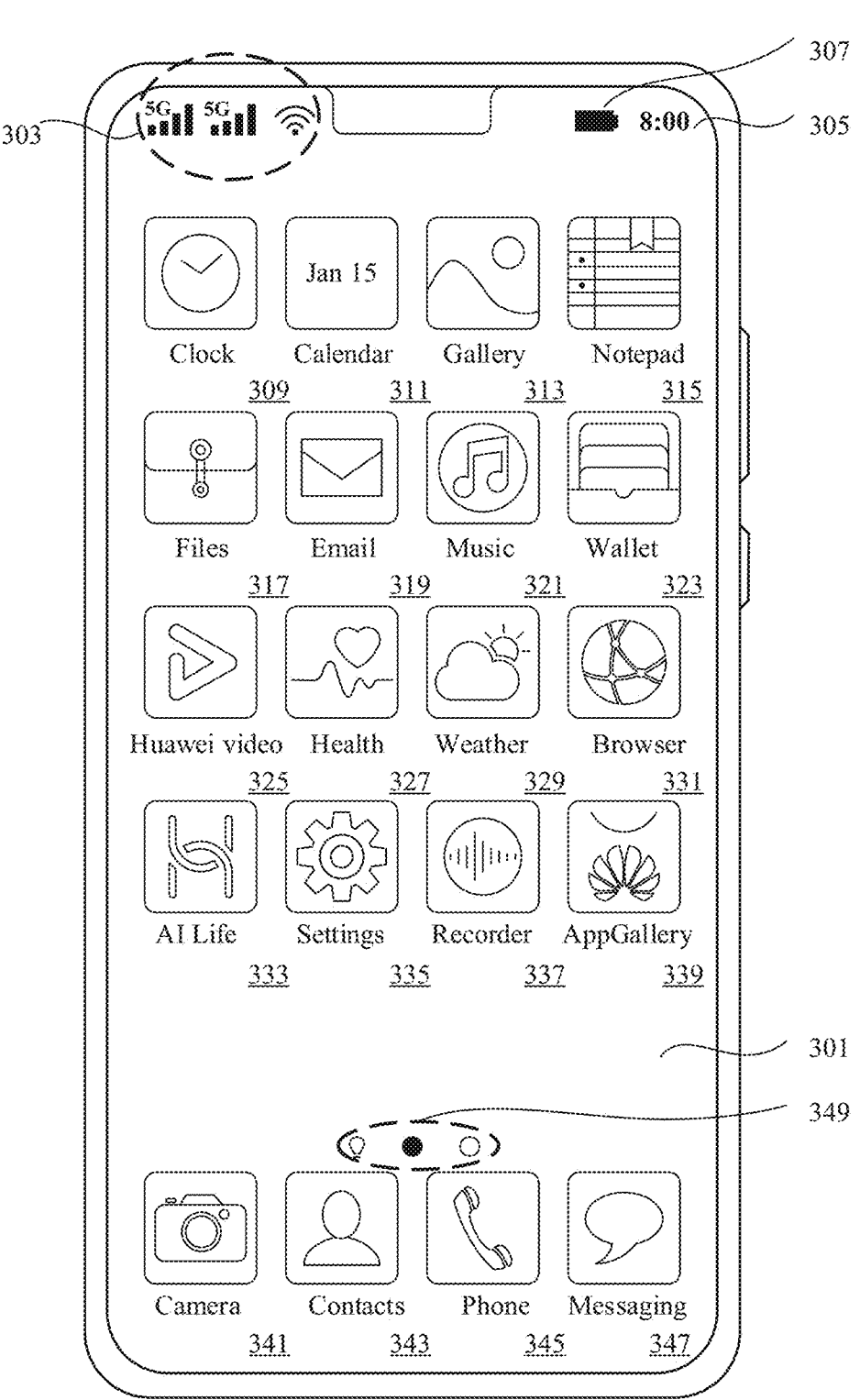
FIG. 3A to FIG. 3E are schematic diagrams of a group of interfaces according to an embodiment of this application.

FIG. 3A shows an example of a user interface 301 of an electronic device 100 according to some implementations. The user interface 301 is optionally displayed on a display of the portable electronic device 100.

In some implementations, the user interface 301 optionally includes the following elements or a subset of the elements or a superset of the elements:

Icons that are fixed on a status bar at the top of the user interface 301 and that are used to indicate a status of the portable electronic device: one or more signal strength (for example, a mobile network or Wi-Fi) indicators 303, current time 305, and a battery level indicator 307 used to indicate a battery level of the battery 213:

applications on a home screen: Clock 309, Calendar 311, Gallery 313, Notepad 315, Files 317, Email 319, Music 321, Wallet 323, Huawei Video 325, Health 327, Weather 329, Browser 331, AI Life 333, Settings 335, Recorder 337, and AppGallery 339;

frequently-used applications fixed at the bottom of the user interface 301: Camera 341, Contacts 343, Phone 345, and Messaging 347; and an indicator 349 indicating a current interface.

It may be understood that the applications on the home screen include Clock 309, Calendar 311, Gallery 313, Notepad 315, Files 317, Email 319, Music 321, Wallet 323, Huawei Video 325, Health 327, Weather 329, Browser 331, AI Life 333, Settings 335, Recorder 337, and AppGallery 339. When the user interface 301 is in another interface used to display an application, the indicator 349 indicating the current interface points to the switched interface, the icons fixed on the status bar at the top of the user interface 301 remain unchanged, and the frequently-used applications fixed at the bottom of the user interface 301 remain unchanged.

It may be understood that the foregoing applications and displayed icons of the applications are merely examples, and may be other applications and/or other icons.

Figure 3B:
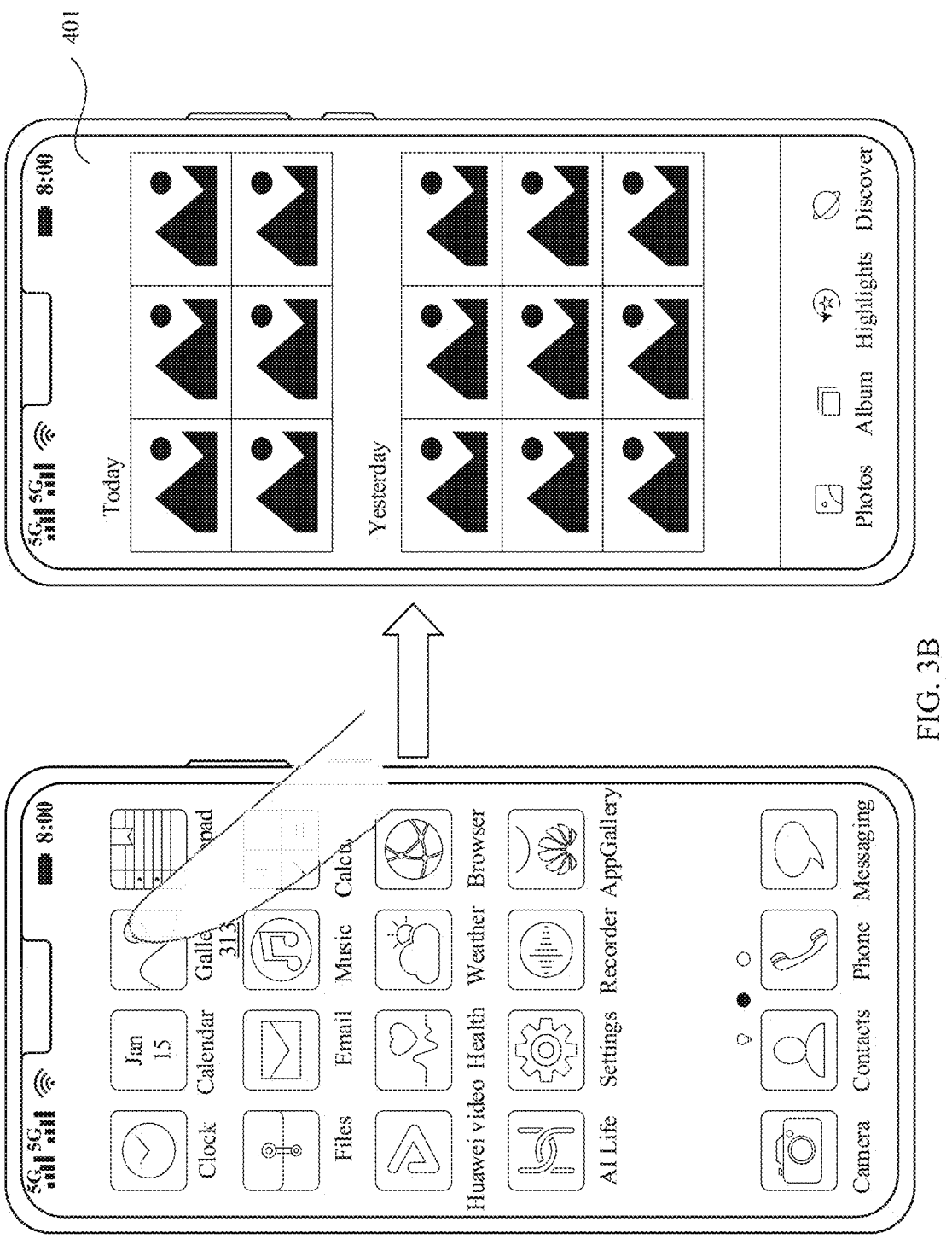

In some embodiments, when detecting an operation of tapping an application by the user, the electronic device 100 starts the application and displays a running interface of the application. As shown in FIG. 3B, the electronic device 100 detects an operation of tapping an icon of Gallery 313 by the user. Assuming that Gallery is not a locked application, the display of the electronic device 100 displays an example interface 401 of Gallery.

Figure 3C:
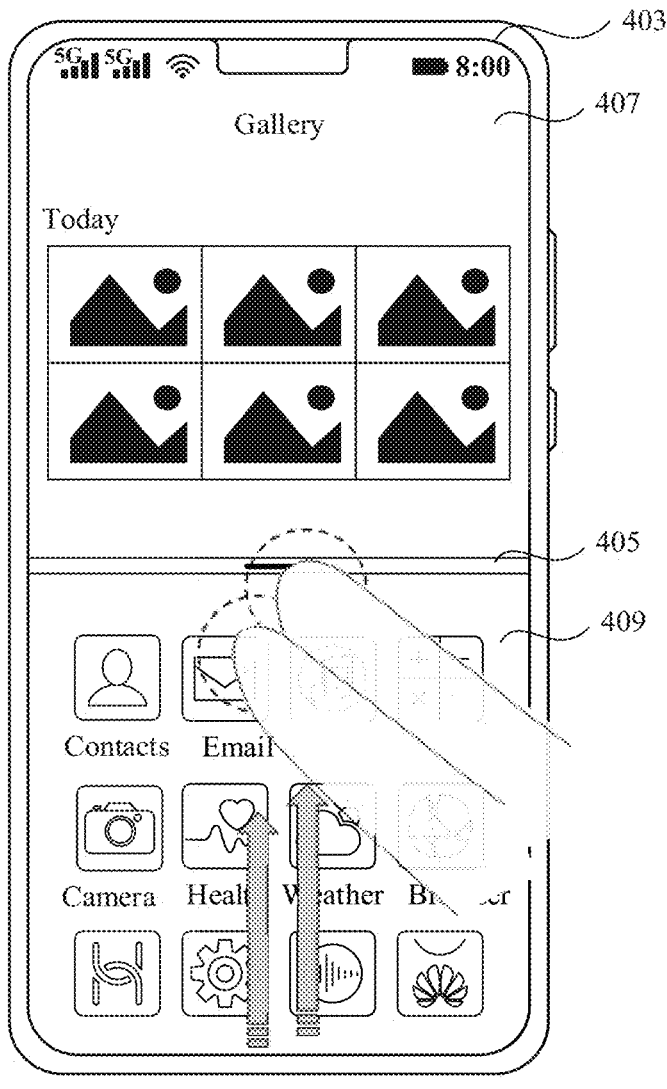

In some embodiments, the user may perform screen splitting by using a touch gesture acting on the display of the electronic device 100. For example, as shown in FIG. 3C, the user may use two fingers to swipe from the bottom of the display, to implement screen splitting. FIG. 3C is a schematic diagram of a display interface after screen splitting. The display interface 403 after screen splitting includes a boundary 405, a first display area 407, and a second display area 409. The first display area 407 and the second display area 409 are respectively located on two sides of the boundary 405. The first display area 403 displays an application interface of Gallery, and the second display area 40) displays application icons accessed in a split-screen mode for user selection. Some applications corresponding to application icons displayed in the second display area 409 may support a split-screen mode, and some applications do not support a split-screen mode. In some implementation solutions, only an icon of an application that supports the split-screen mode may be displayed.

It may be understood by a person skilled in the art that the first display area 407 and the second display area 409 may be arranged from top to bottom, or may be arranged from left to right. A specific arrangement manner is not specifically limited in this embodiment.

Further, a location of the boundary 405 may be adjusted after screen splitting. After a location of the boundary on the display interface is changed, a size and/or a location of the display area changes accordingly after screen splitting. After it is detected that time for touching and holding the boundary exceeds predetermined time, the boundary prompts, in a highlighted manner, the user to adjust a location of the boundary. The user may adjust a location of the boundary 405 by touching the display and moving the boundary 405.

In some other embodiments, the display interface may be further divided into three, four, or more display areas according to the screen splitting method in this embodiment of the present invention. Alternatively, a display form of the display area is not limited to separate arrangement and display, and may alternatively be overlapping display. For example, the second display area is displayed above the first display area in a form of a floating window. This is not listed herein.

It should be noted that an operation method for starting screen splitting is not limited to the foregoing two-finger sliding. Alternatively, the operation method may be that two fingers, three fingers, four fingers, five fingers, or even more fingers touch the display simultaneously or successively, or may be that a screen splitting control is selected by tapping on a multi-task interface, or may be a preset gesture such as finger knocking. This is not specifically limited in this embodiment.

Figure 3D:
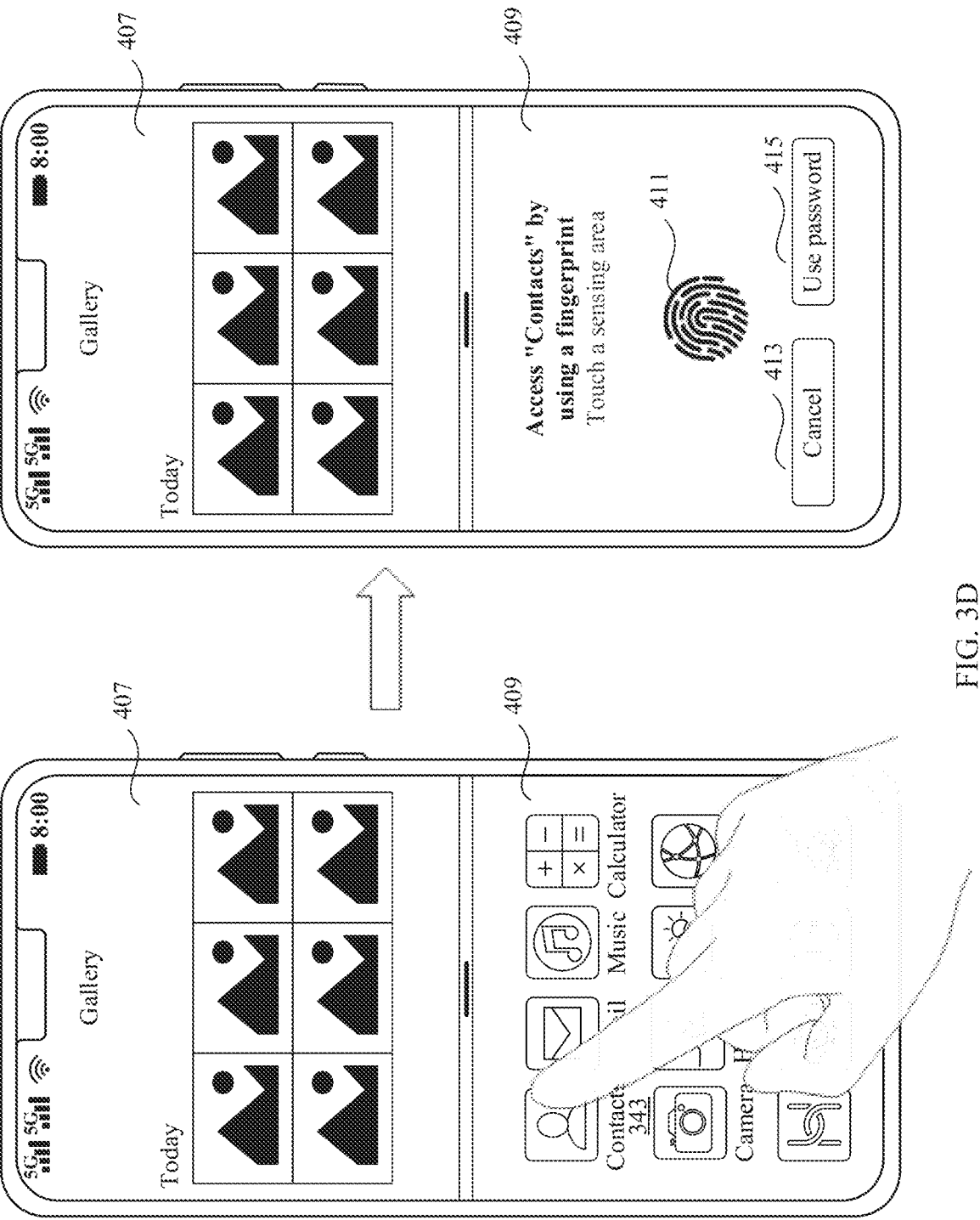

As shown in FIG. 3D, the electronic device 100 detects an operation of tapping an icon of Contacts 343 by the user in the second display area 409. Assuming that Contacts is a locked application, and an application lock authentication type is fingerprint authentication, the second display area 409 displays an application lock authentication interface of Contacts. A fingerprint icon 411 is displayed at a location corresponding to a fingerprint sensing area, and the fingerprint icon 411 may be highlighted to prompt the user that a location of the icon is the fingerprint sensing area. In some cases, the application lock authentication interface further displays a "Cancel" control 413 and a "Use password" control 415. The user may exit access to Contacts by tapping the "Cancel" control, and return to a previous display interface. The user may jump to an authentication interface for entering a password by tapping the "Use password" control, and enter a preset password to access Contacts.

It should be noted that the fingerprint sensing area may be disposed on the display of the electronic device 100, or may be disposed in an area outside the display, for example, a Home button, or a backplane of the electronic device. This is not limited in this embodiment.

Figure 3E:
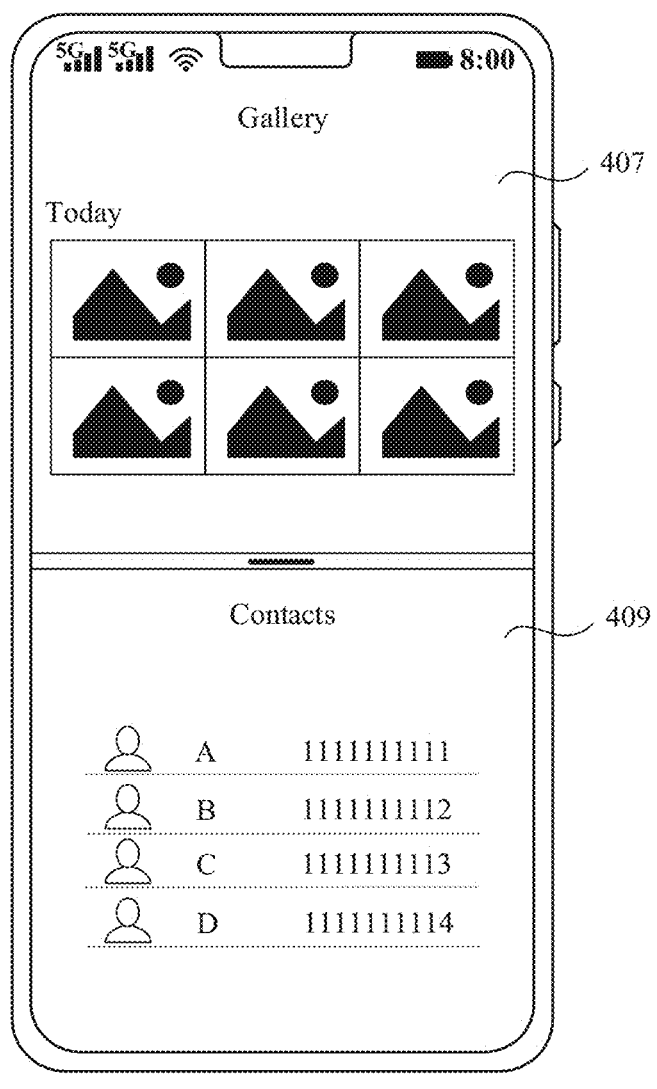

As shown in FIG. 3E, after the user performs fingerprint authentication by touching the fingerprint sensing area indicated by the fingerprint icon 411, if an authentication result indicates that an entered fingerprint matches a preset unlocking fingerprint, that is, authentication succeeds, the second display area 409 displays an application interface of Contacts. Therefore, the user can unlock, in a split-screen mode, a locked application of one of accessed applications.

In some other embodiments, an application lock authentication type of a locked application may alternatively be face recognition, voiceprint recognition, iris recognition, gesture recognition, or the like.

Figure 4A:
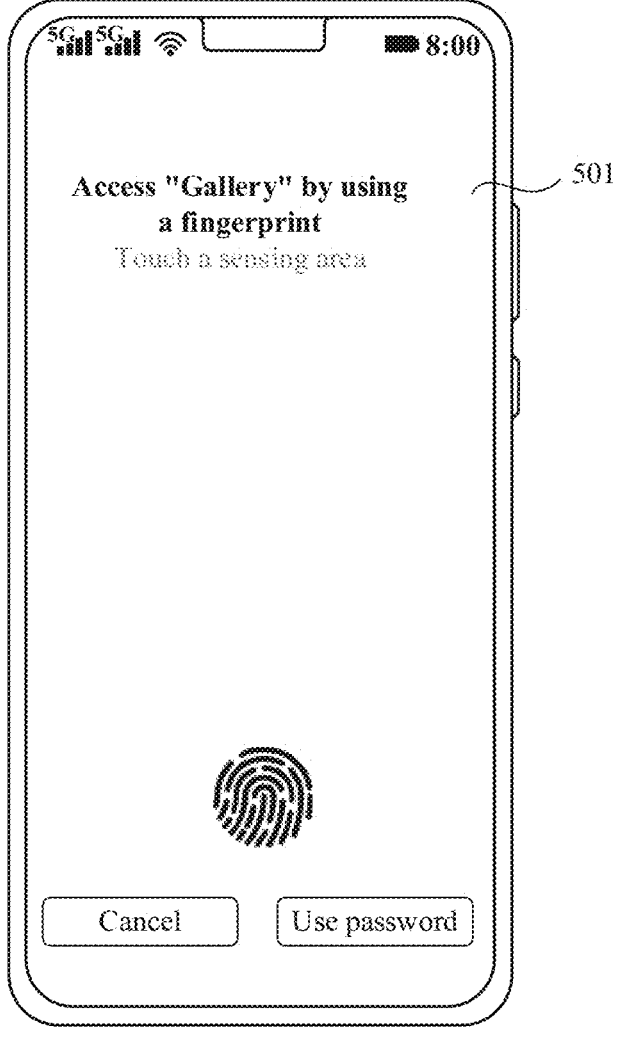
FIG. 4A to FIG. 4C are schematic diagrams of another group of interfaces according to an embodiment of this application.

In some other embodiments, as shown in FIG. 4A, the electronic device 100 first starts Gallery in response to a user operation. Assuming that Gallery is a locked application, and an application lock authentication type is fingerprint authentication, a display interface 501 is an application lock authentication interface of Gallery.

Figure 4B:
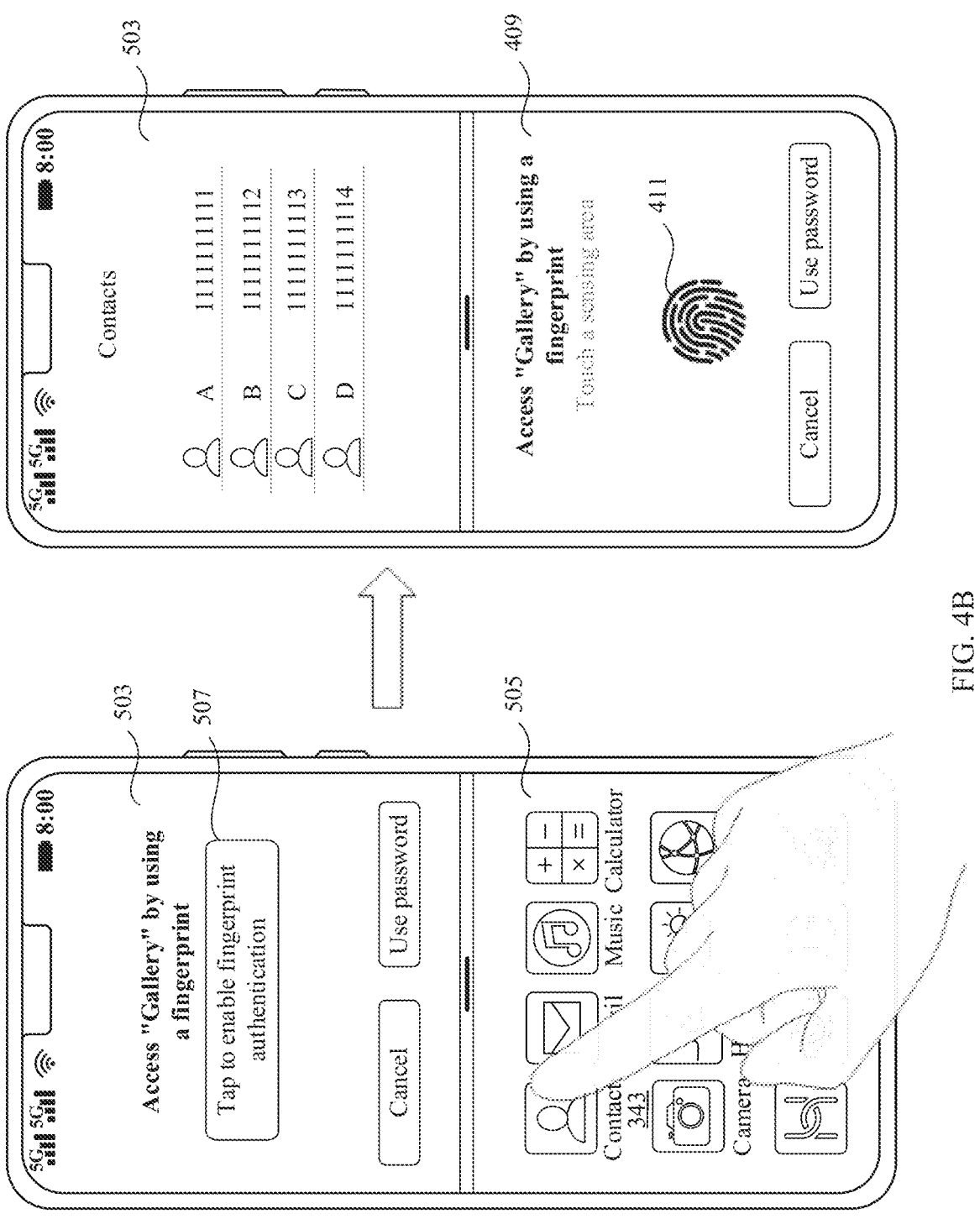

Further, the user performs screen splitting by using a touch gesture acting on the display of the electronic device 100. As shown in FIG. 4B, a first display area 503 displays an application lock authentication interface of Gallery after a screen is split. In this case, a fingerprint authentication device is not started. The authentication interface displays a "Tap to enable fingerprint authentication" control 507 that is configured to: in response to a tapping operation of the user, enable fingerprint authentication and display a fingerprint icon. A second display area 505 displays application icons accessed in a split-screen mode for user selection. The electronic device 100 detects an operation of tapping the icon of Contacts 343 in the second display area 505 by the user. Assuming that Contacts is not a locked application, the first display area 503 displays an application interface of Contacts, and the second display area 505 displays an application lock authentication interface of Gallery. In addition, the fingerprint authentication device is automatically started, and the fingerprint icon 411 corresponding to the fingerprint sensing area is highlighted.

That is, Gallery that is started first is a locked application of the fingerprint authentication type, and Contacts that is started later is not a locked application. After detecting that the user selects Contacts based on a display area of the fingerprint sensing area, the electronic device 100 switches, to the second display area 505 for display, the application lock authentication interface of Gallery originally displayed in the first display area 503, starts the fingerprint authentication device, and highlights the fingerprint icon 411 corresponding to the fingerprint sensing area. Therefore, the electronic device 100 can display a corresponding application lock authentication interface in a display area in which the fingerprint sensing area is disposed, and can further display Contacts simultaneously, to implement an unlocking function of an application lock in a split-screen mode. In addition, a user operation is more convenient. A fingerprint authentication operation can be completed when the electronic device 100 is held with one hand, which complies with a use habit of the user.

Figure 4C:
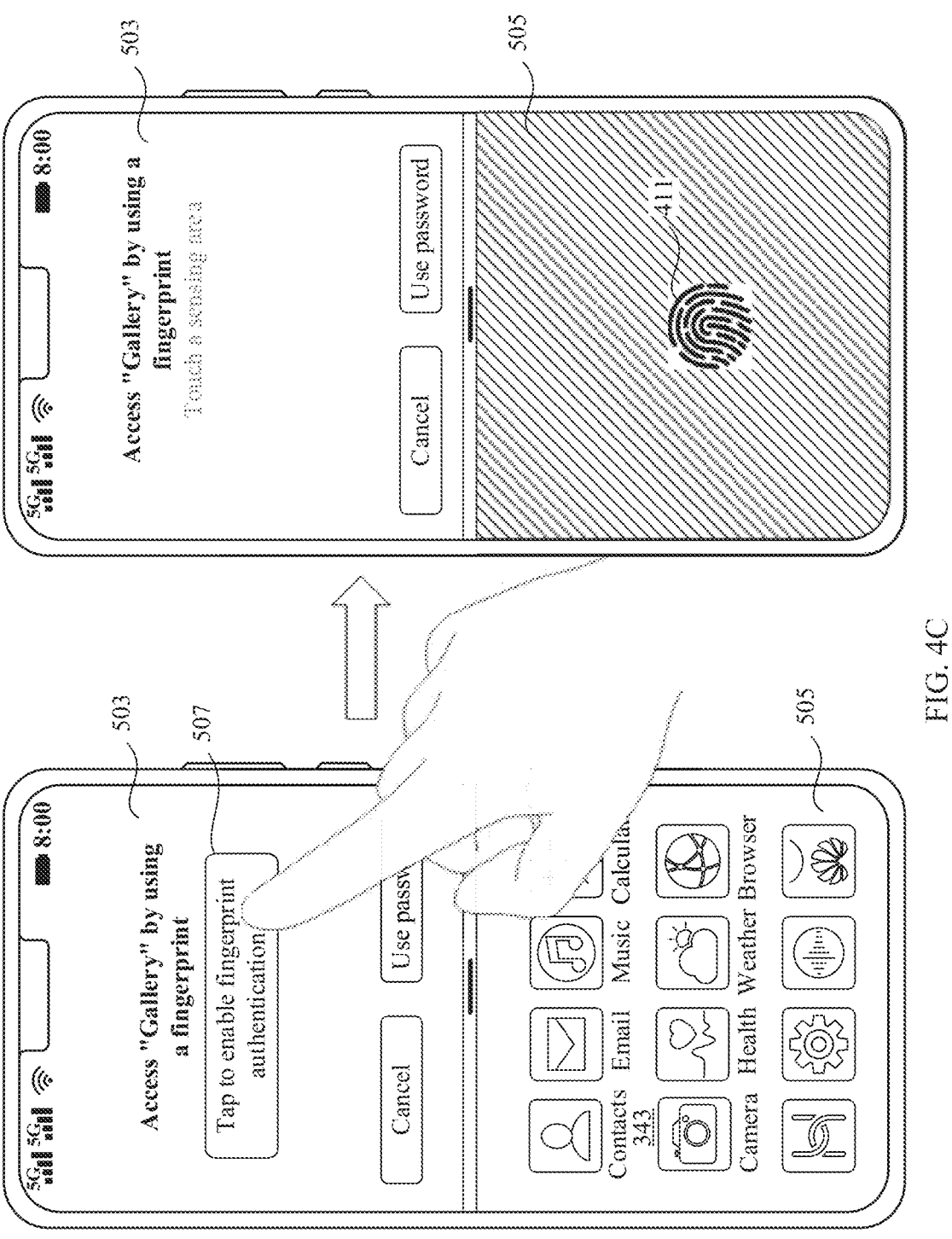

In another case, as shown in FIG. 4C, after the user performs screen splitting by using a touch gesture acting on the display of the electronic device 100, the first display area 503 displays an application lock authentication interface of Gallery. In this case, a fingerprint authentication device is not started. The authentication interface displays a "Tap to enable fingerprint authentication" control 507 that is configured to: in response to a tap operation of the user, enable fingerprint authentication and display a fingerprint icon. The second display area 505 displays application icons accessed in a split-screen mode for user selection. Then, the electronic device 100 detects an operation of tapping the "Tap to enable fingerprint authentication" control 507 in the first display area 503 by the user, the fingerprint icon 411 located in the second display area is displayed, and a fingerprint sensing device is started. Brightness of a display interface originally located in the second display area 505 is dimmed, and a dimmed area other than the fingerprint icon 411 no longer responds to a touch operation of the user. After the user completes fingerprint unlocking or disables fingerprint authentication, the second display area 505 displays an original interface. Therefore, the electronic device 100 can implement, in the second display area in which the fingerprint sensing area is disposed, fingerprint unlocking authentication on the application lock authentication interface in the first display area.

Figure 5A:
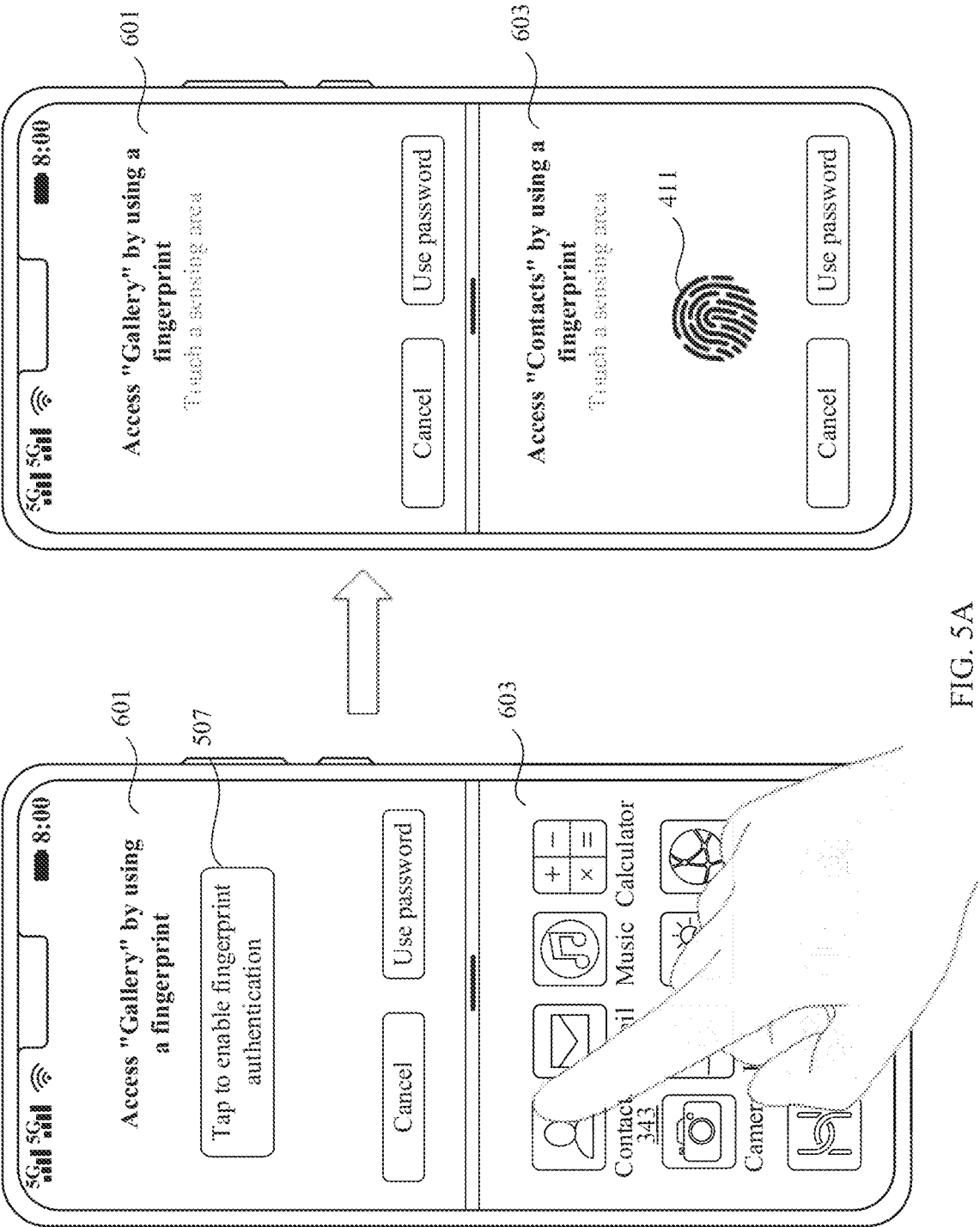
FIG. 5A and FIG. 5B are schematic diagrams of another group of interfaces according to an embodiment of this application.

In some other embodiments, as shown in FIG. 5A, after the user performs screen splitting by using a touch gesture acting on the display of the electronic device 100, a first display area 601 displays an application lock authentication interface of Gallery, and an application lock authentication type is fingerprint authentication. In this case, a fingerprint authentication device is not started. The authentication interface displays a "Tap to enable fingerprint authentication" control 507 that is configured to; in response to a tap operation of the user, enable fingerprint authentication and display a fingerprint icon. A second display area 603 displays application icons accessed in a split-screen mode for user selection. The electronic device 100 detects an operation of tapping the icon of Contacts 343 by the user. Assuming that Contacts is a locked application, and the authentication type of the application lock is fingerprint authentication, the second display area 603 displays an application lock authentication interface of Contacts. In addition, the fingerprint authentication device is automatically started, and the fingerprint icon 411 corresponding to the fingerprint sensing area is highlighted. The application lock authentication interface of Gallery in the first display area 601 is updated, and the "Enable fingerprint authentication" control 507 is no longer displayed.

Figure 5B:
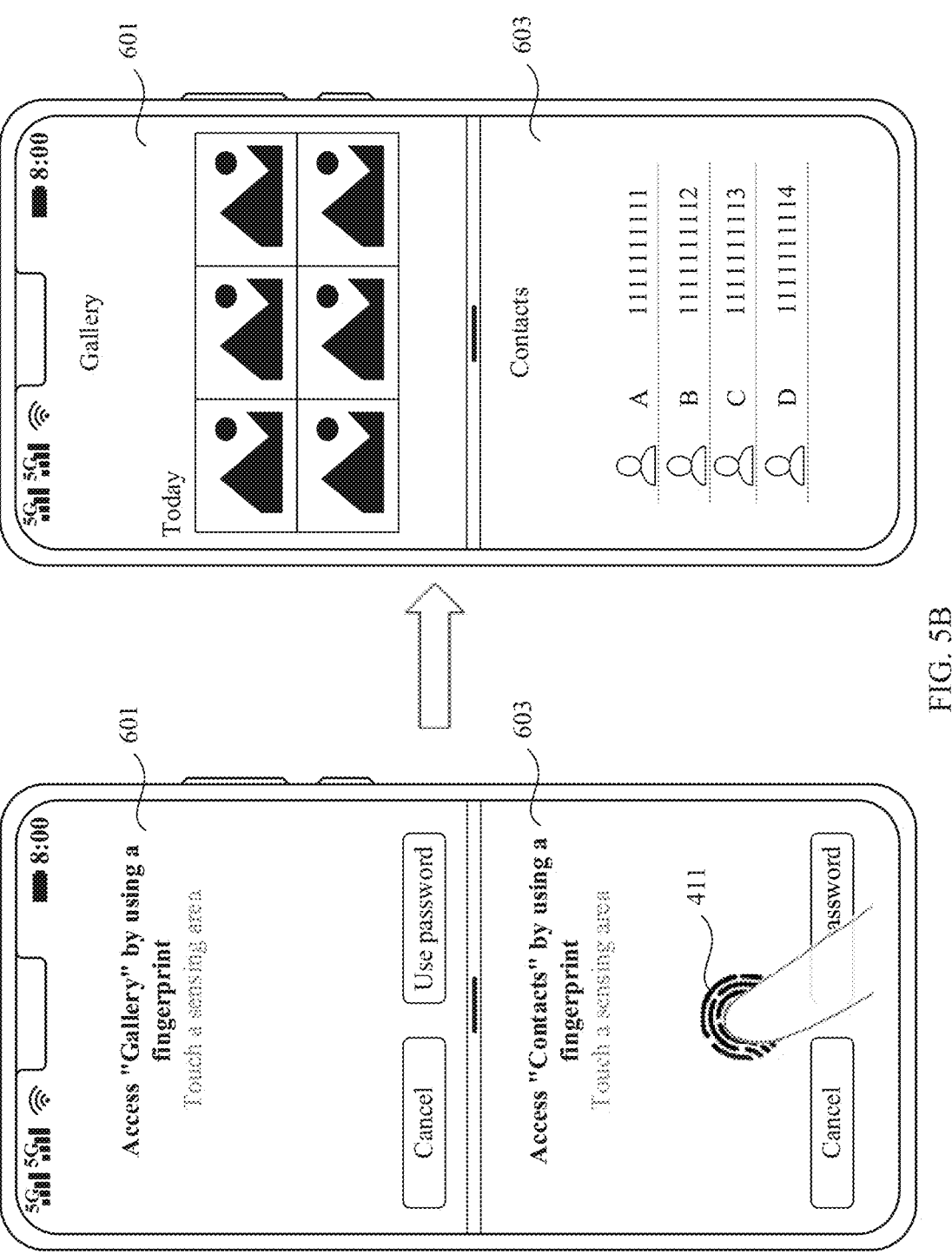

Then, as shown in FIG. 5B, after the user performs fingerprint authentication by touching the fingerprint sensing area indicated by the fingerprint icon 411, if an authentication result indicates that an entered fingerprint matches a preset unlocking fingerprint, that is, authentication succeeds, the first display area 601 and the second display area 603 respectively display an application interface of Gallery and an application interface of Contacts. Therefore, when the electronic device has an authentication conflict mechanism of an application lock, a plurality of application lock authentication requests that need to invoke the fingerprint authentication device can be processed in a split-screen mode. In addition, an authentication result of one authentication request is reused, and the user needs to perform fingerprint verification only once to unlock a plurality of accessed locked applications.

Figure 6:
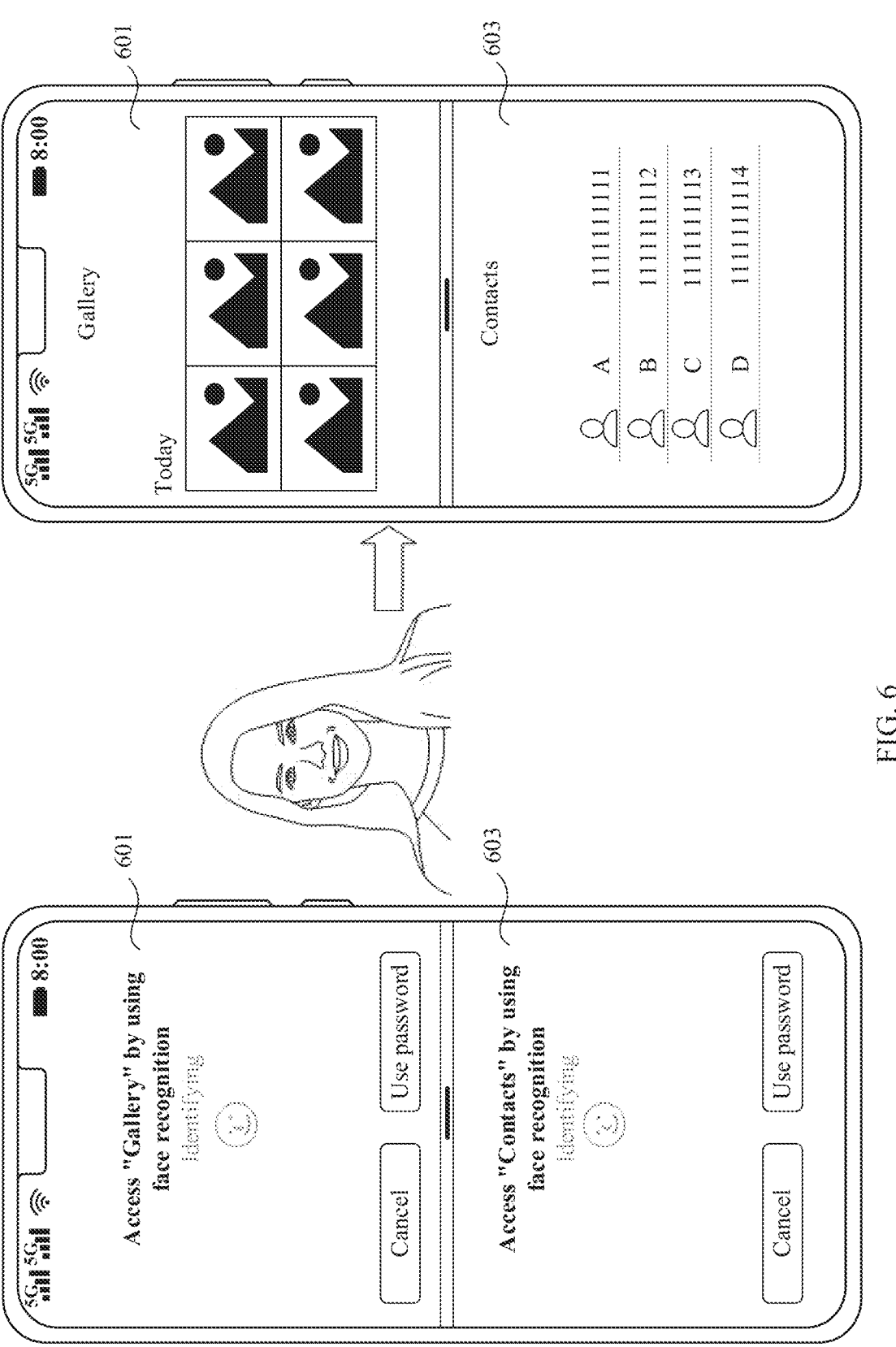
FIG. 6 is a schematic diagram of an interface according to an embodiment of this application.

In some other embodiments, as shown in FIG. 6, the user accesses Gallery and Contacts in a split-screen mode. An application lock authentication type of Gallery is face recognition, and an application lock authentication type of Contacts is also face recognition. The electronic device 100 may collect face information of the user by using a camera. After the electronic device collects the face information, the electronic device 100 may match the collected face information with a stored face information template. If an authentication result indicates that the face information matches the prestored face information template, that is, authentication succeeds, the first display area 601 and the second display area 603 respectively display an application interface of Gallery and an application interface of Contacts.

Figure 7A:
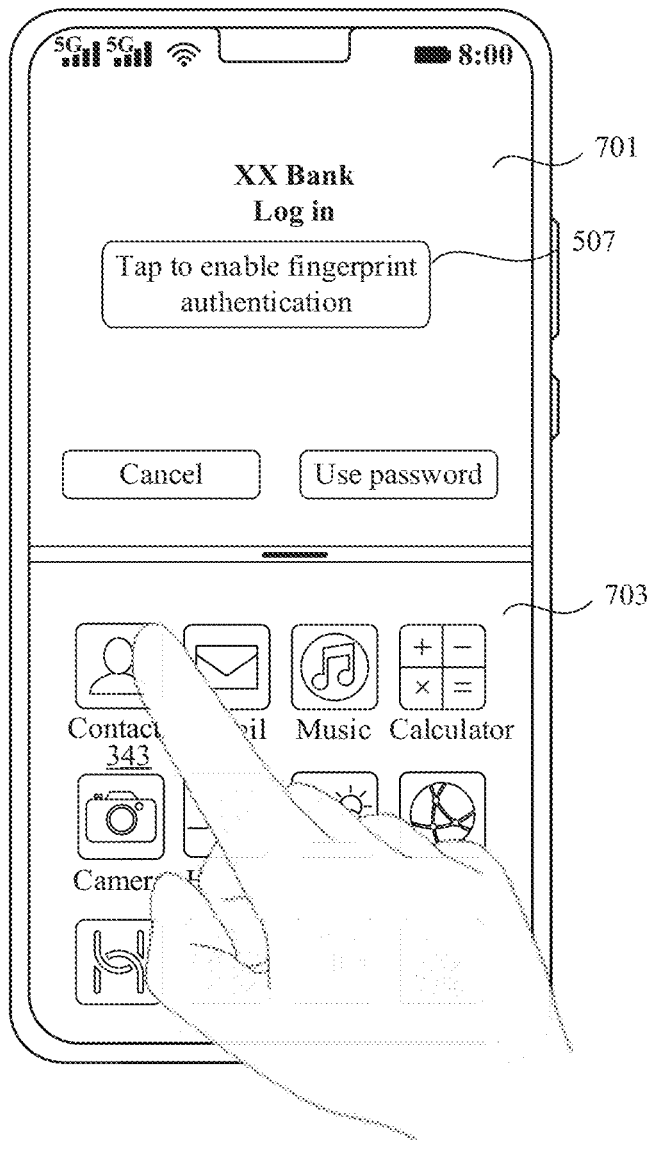
FIG. 7A to FIG. 7D are schematic diagrams of another group of interfaces according to an embodiment of this application.
Figure 7B:
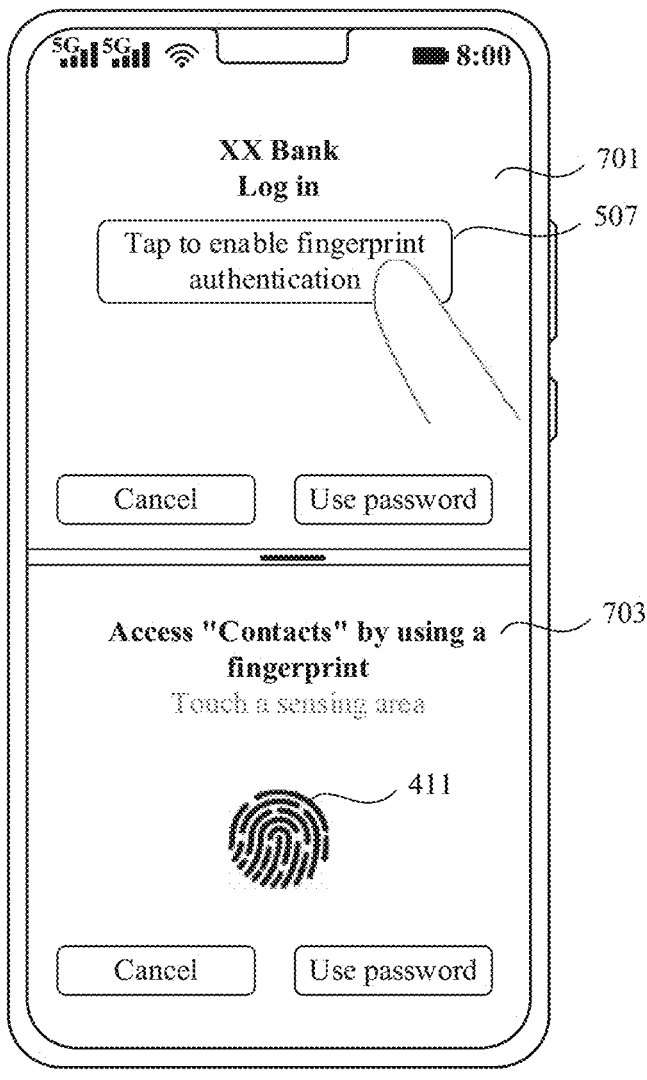
Figure 7C:
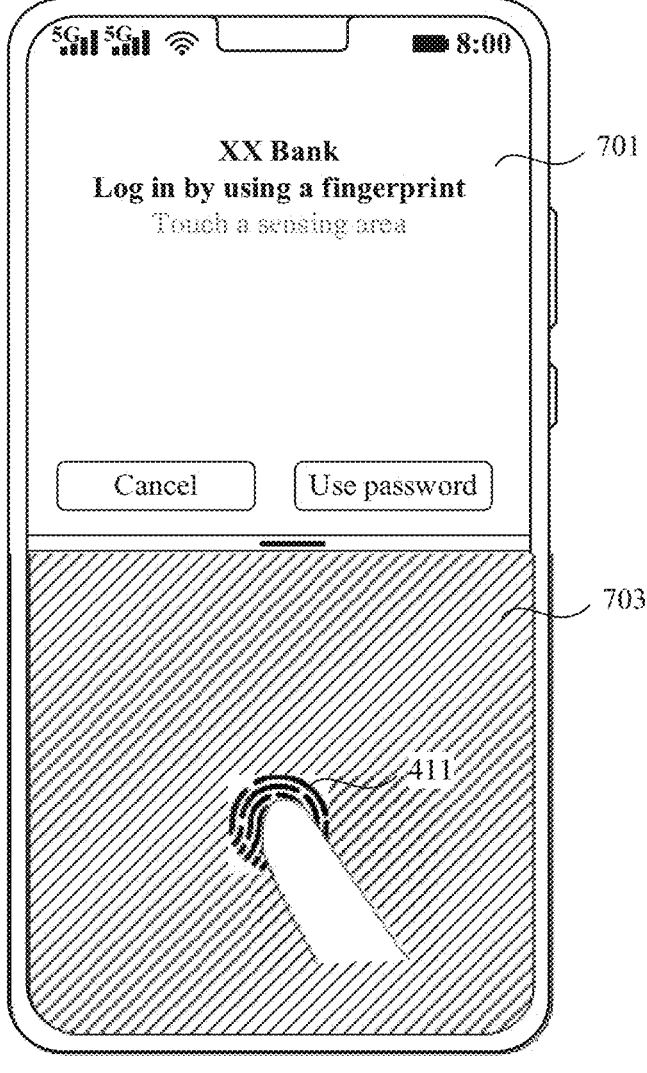
Figure 7D:
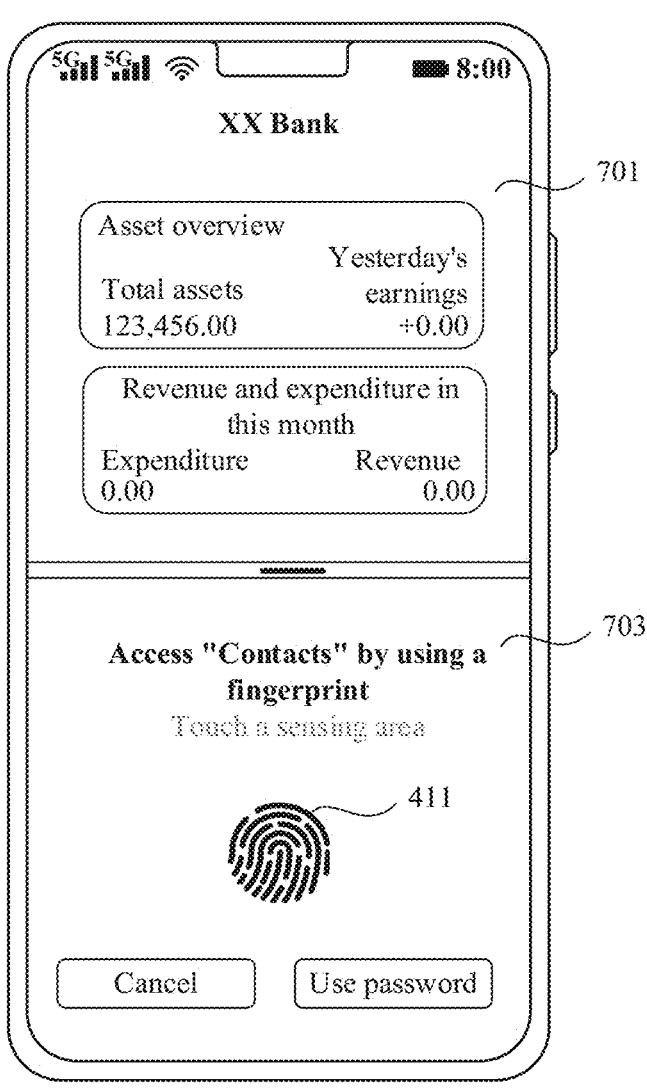

In some embodiments, an application may lock some application interfaces related to security or privacy. For example, a locked authentication page may be preset on a login interface of a bank application, and a bank account can be logged in only after authentication succeeds. Further, a user may use a function (such as balance query, transfer, or fund purchase) having a relatively high security or privacy requirement in the application. For another example, a locked authentication page may be preset on a payment interface of a digital wallet application, and payment can be completed only after authentication succeeds. As shown in FIG. 7A, after the user performs screen splitting by using a touch gesture acting on the display of the electronic device 100, a first display area 701 displays an application lock authentication interface on a login interface of an XX bank, and an application lock authentication type is fingerprint authentication. The authentication interface displays a "Tap to enable fingerprint authentication" control 507 that is configured to: in response to a tap operation of the user, enable fingerprint authentication and display a fingerprint icon. A second display area 703 displays application icons accessed in a split-screen mode for user selection. The electronic device 100 detects an operation of tapping the icon of Contacts 343 by the user. Assuming that Contacts is a locked application, and the authentication type of the application lock is fingerprint authentication, as shown in FIG. 7B, the second display area 703 displays an application lock authentication interface of Contacts. A fingerprint icon 411 is displayed at a location corresponding to a fingerprint sensing area. After the user taps the "Enable fingerprint authentication" control 507 on the login interface of the XX bank, as shown in FIG. 7C, the first display area 701 displays the application lock authentication interface on the login interface of the XX bank, and prompts the user to touch a fingerprint sensing area for authentication, and the second display area 703 highlights the fingerprint icon 411 corresponding to the fingerprint sensing area. Brightness of the application lock authentication interface of Contacts originally located in the second display area 703 is dimmed, and a dimmed area other than the fingerprint icon 411 no longer responds to a touch operation of the user. After the user completes fingerprint unlocking or disables fingerprint authentication, as shown in FIG. 7D, the first display area 701 displays an application interface after the XX bank is logged in, and the second display area 703 displays the application lock authentication interface of Contacts.

Figure 8A:
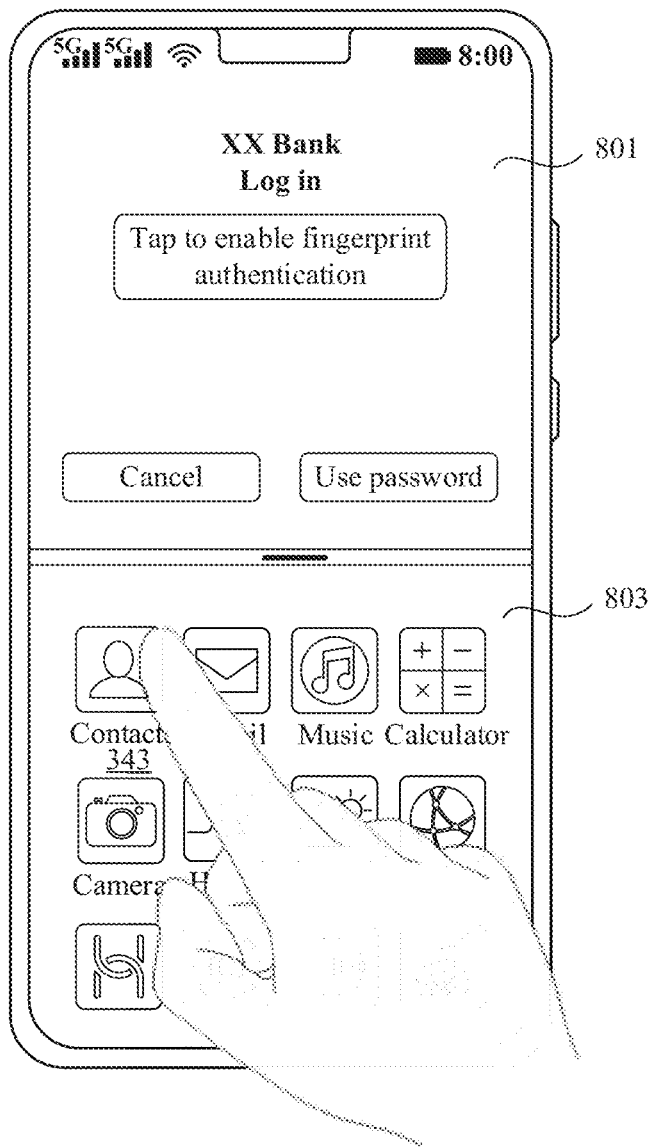
FIG. 8A and FIG. 8B are schematic diagrams of another group of interfaces according to an embodiment of this application.
Figure 8B:
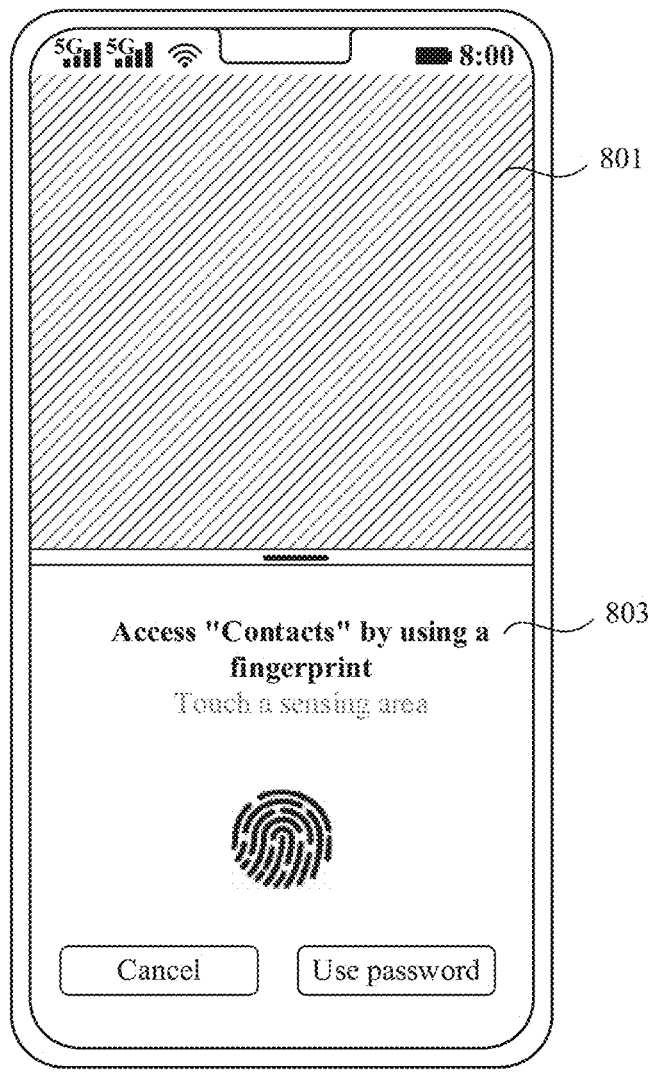

In some other embodiments, as shown in FIG. 8A, after the user performs screen splitting by using a touch gesture acting on the display of the electronic device 100, a first display area 801 displays an application lock authentication interface on a login interface of an XX bank, and an application lock authentication type is fingerprint authentication. The authentication interface displays a "Tap to enable fingerprint authentication" control. A second display area 703 displays application icons accessed in a split-screen mode for user selection. After the electronic device 100 detects an operation of tapping the icon of Contacts 343 by the user, assuming that Contacts is a locked application, and an application lock authentication type is fingerprint authentication, as shown in FIG. 8B, the second display area 803 displays an application lock authentication interface of Contacts, and brightness of a display interface originally located in the first display area 801 is dimmed. Therefore, the user may learn, based on the interface display, that current fingerprint authentication is used to access "Contacts", but is not used for authentication on the login interface of the XX bank.

Figure 9:
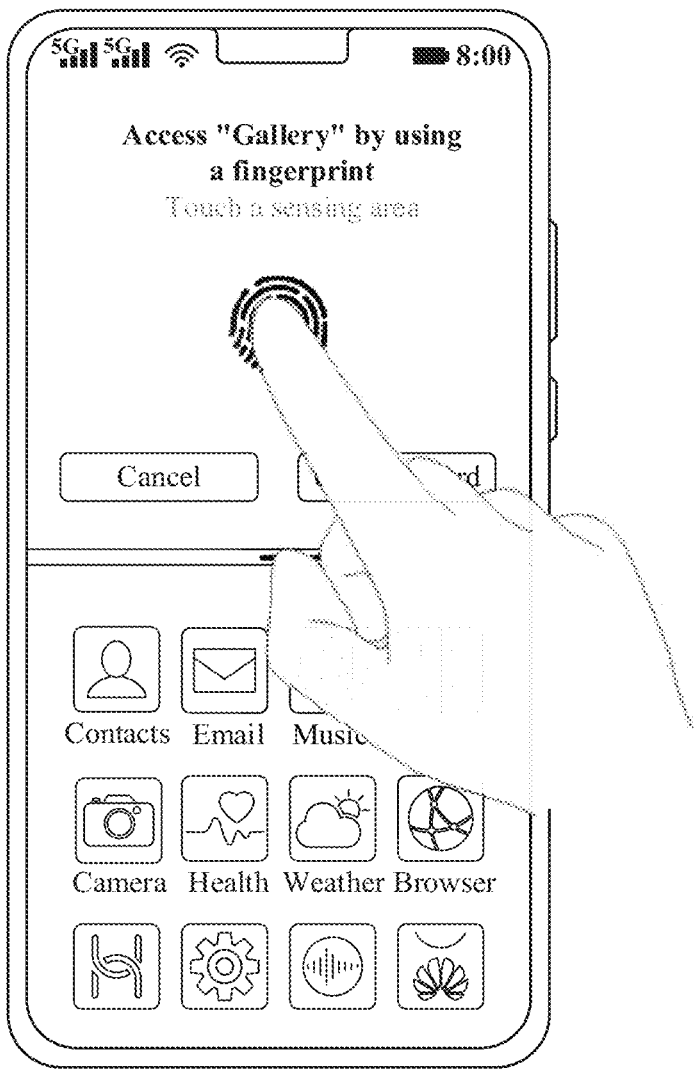
FIG. 9 is a schematic diagram of another interface according to an embodiment of this application.

In some other embodiments, as shown in FIG. 9, for example, a fingerprint sensing area of the electronic device 100 is disposed in any area on the display or in an area outside the display (for example, a back of the electronic device). After detecting screen splitting performed by the user, the electronic device 100 may also directly display an authentication interface corresponding to a locked application, and start a fingerprint sensing device, so that the user may directly perform a fingerprint authentication operation in the fingerprint sensing area.

Figure 10:
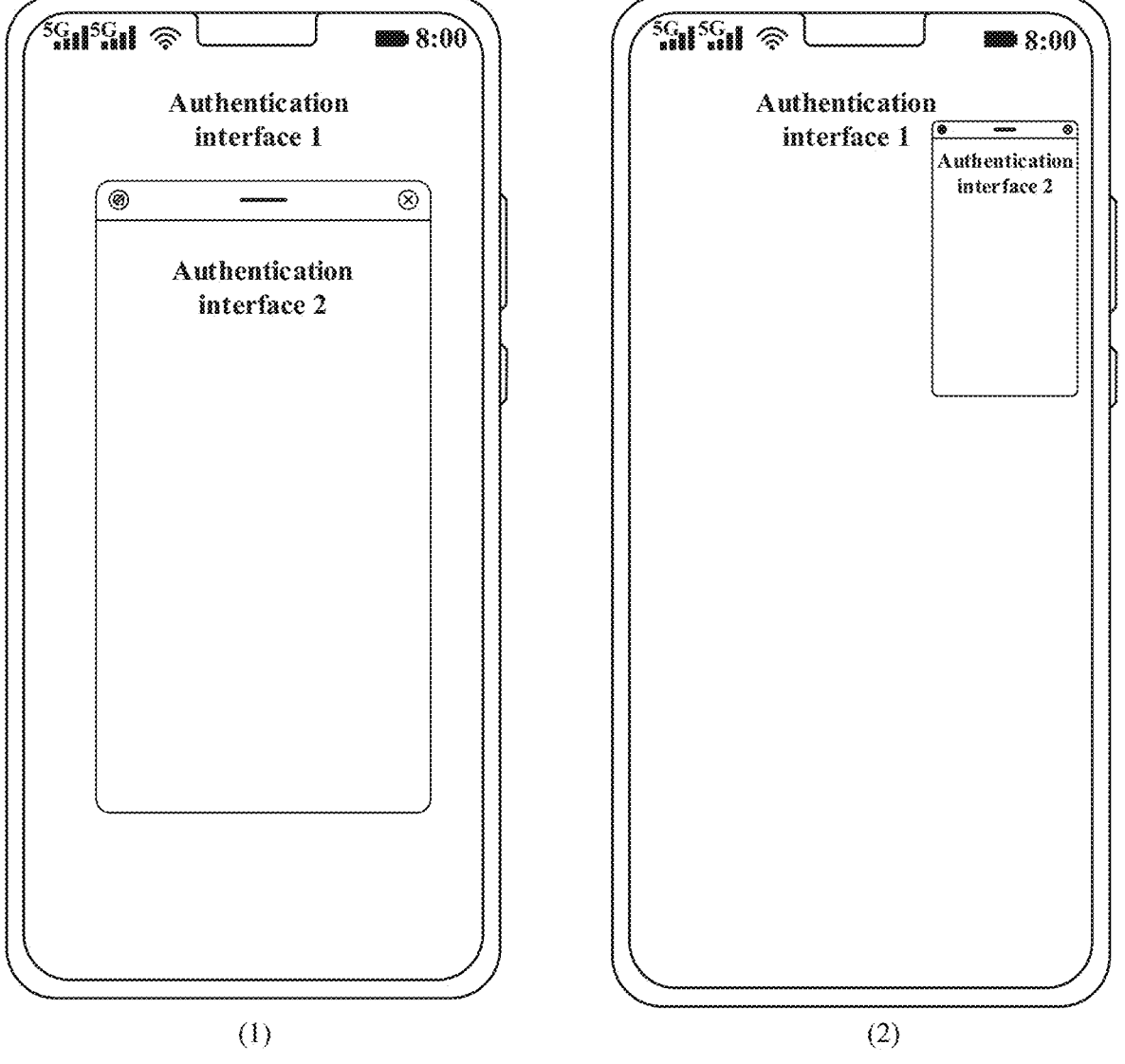
FIG. 10 is a schematic diagram of another interface according to an embodiment of this application.

It may be understood that the solution in this embodiment of this application is not limited to being applied to the foregoing split-screen mode, and may also be applied to an interface shown in FIG. 10(1). That is, an electronic device distinguishes between different display areas by using a floating window, and therefore an authentication interface 1 may be displayed in a first display area, an authentication interface 2 may be displayed in a second display area, and the authentication interface 2 may cover a part of the authentication interface 1. Alternatively, the solution may be applied to an interface shown in FIG. 10(2). That is, an electronic device distinguishes between different display areas in a small-window mode, and therefore an authentication interface 1 may be displayed in a first display area, and an authentication interface 2 may be displayed in a second display area.

Figure 11:
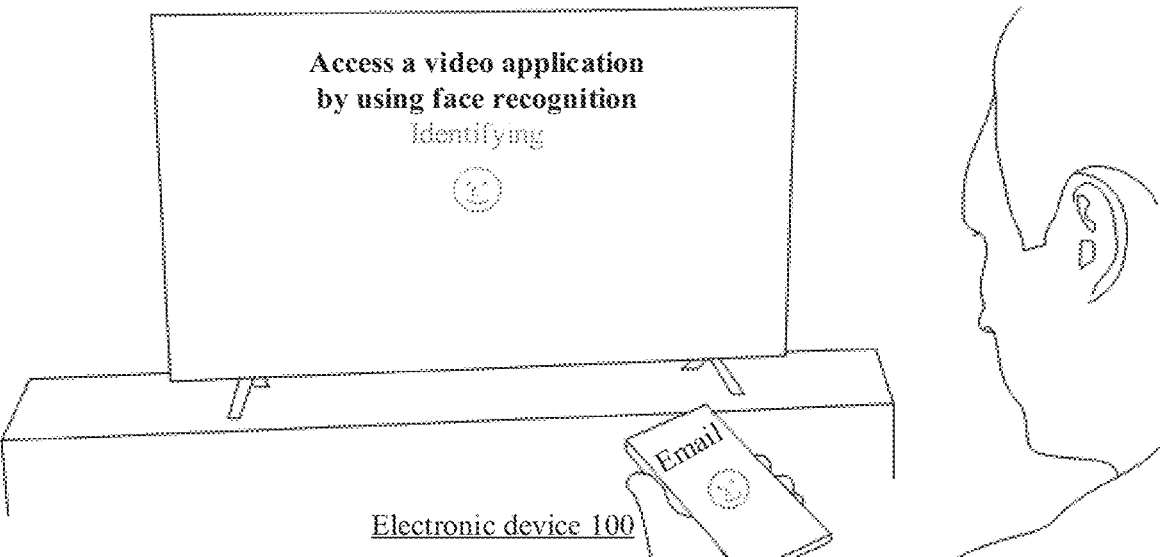
FIG. 11 is a schematic diagram of an interface according to an embodiment of this application.

In some other embodiments, as shown in FIG. 11, the electronic device 100 has a screen projection function. A user may access Email on the electronic device 100, and project Video to another electronic device 200 (for example, a television). A communication relationship may be established between the electronic device 100 and the electronic device 200, and both the electronic device 100 and the electronic device 200 have a camera and a face information collection module. It is assumed that application lock authentication interfaces are triggered when both Email and Video are accessed, the electronic device 100 may collect face information by using a camera of the electronic device 100, or the electronic device 200 may collect face information by using a camera of the electronic device 200, and then send the collected face information to the electronic device 100. The electronic device 100 matches the collected face information with a stored face information template. If an authentication result indicates that the face information matches the prestored face information template, that is, authentication succeeds, the electronic device 100 and the electronic device 200 respectively display an application interface of Email and an application interface of Video.

It should be noted that the application interfaces or the application lock authentication interfaces in the foregoing embodiment may be started in a sequence, or may be started simultaneously. This is not limited.

Figure 12:
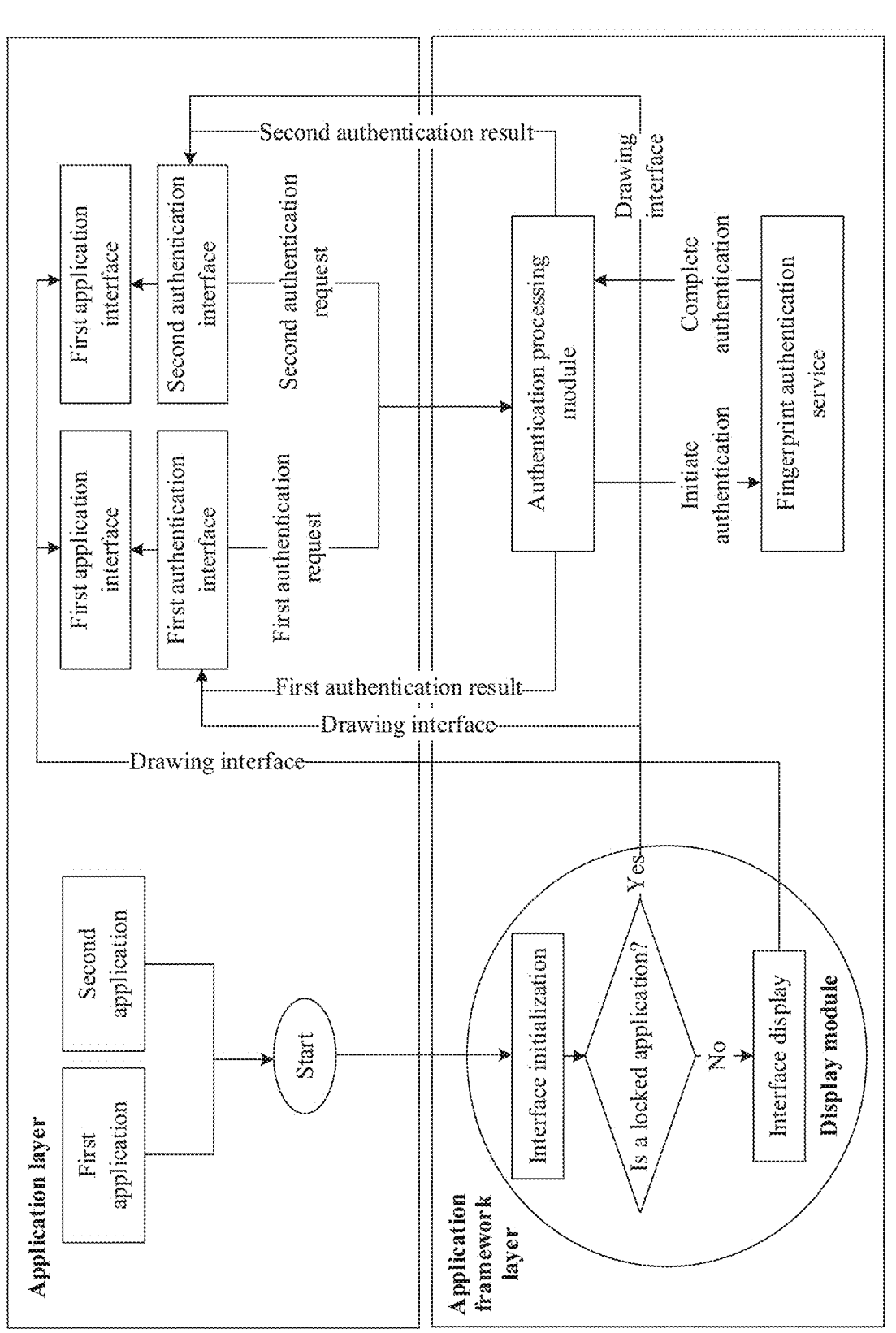
FIG. 12 is a schematic diagram of a software structure according to an embodiment of this application.

FIG. 12 is a schematic diagram of a software structure of application lock authentication according to an embodiment of this application.

For example, in a scenario in which the electronic device 100 is in a split-screen mode, a first application and a second application may be simultaneously started or run in the foreground; or a first application and a second application are separately started. It is assumed that both the first application and the second application are locked applications, application lock authentication types are both fingerprint authentication, and the electronic device 100 stores a fingerprint information template of a user.

For example, the first application is started. Interface initialization is first performed, and it is determined whether the first application is a locked application. Specifically, whether the first application has been written into a locked list of the application lock may be queried by using an index database in a system; and if yes, a first authentication interface is displayed; or if no, a first application interface is displayed.

Further, after it is determined that the first application is the locked application, the first authentication interface is displayed. The first authentication interface initiates a first authentication request to an authentication processing module. After receiving the first authentication request, the authentication processing module initiates authentication to a fingerprint authentication service in the system. The fingerprint authentication service collects a fingerprint of the user by using a touch display of the electronic device or a preset fingerprint collector, and performs matching between the collected fingerprint of the user and the prestored fingerprint information template for authentication. After the fingerprint authentication service completes authentication, the authentication processing module returns a first authentication result to the first authentication interface. Specifically, if the collected fingerprint information of a finger of the user matches the stored fingerprint information template (that is, fingerprint recognition succeeds), an authentication result is "authentication succeeds". Further, the first application interface may be displayed. If the collected fingerprint information of the finger of the user does not match the stored fingerprint information template (that is, fingerprint recognition fails), an authentication result is "authentication fails". Further, the first authentication interface displays, to the user, information related to "authentication fails", and may further initiate an authentication request to the authentication processing module again.

In some other cases, after the fingerprint authentication service completes authentication, and the authentication processing module returns the first authentication result to the first authentication interface, the second application is further started to display a second authentication interface. For a processing process of a second authentication request initiated by the second authentication interface, refer to the foregoing processing process of the first authentication request. Details are not described herein again.

In some other cases, assuming that types of authentication requests initiated by the first authentication interface and the second authentication interface are both fingerprint authentication, and after the authentication processing module has initiated authentication to the fingerprint authentication service based on the first authentication request, the fingerprint authentication service is in an operating state of being authenticated. In this case, when an initiation moment of the second authentication request of the second authentication interface is the same as or adjacent to that of the first authentication request, the second authentication request may reuse, by using the authentication processing module, an authentication result of the first authentication request, or initiate authentication to the fingerprint authentication service after the fingerprint authentication service completes authentication.

In some embodiments, if both the first authentication interface corresponding to the first application and the second authentication interface corresponding to the second application are authentication interfaces of an application lock module in the system, only one authentication request may be initiated, and the authentication processing module may obtain only the one authentication request and perform corresponding processing.

Therefore, according to the implementation solution of this application, the electronic device can not only process separately initiated authentication requests, but also process concurrent authentication requests. In this way, the electronic device can display, in response to accessing more than one locked application by the user, an authentication interface corresponding to a locked application, then obtain authentication information of the user to generate an authentication result, and display an unlocked application interface. The concurrent authentication requests may indicate that a plurality of authentication requests use a same authentication result, or may indicate that authentication requests are stored in a queue, and authentication is initiated in an orderly manner based on the authentication requests after a system authentication service is in an idle state. This can avoid interruption of an authentication process or no response caused by the fact that a plurality of authentication requests invoke a same system authentication service, and an authentication result cannot be returned or cannot be returned in time to an authentication interface that initiates an authentication request. For example, when the fingerprint authentication service has responded to the first authentication request and is in an operating state of being authenticated, after receiving the second authentication request, the fingerprint authentication service responds to the second authentication request and interrupts the originally responded first authentication request. As a result, the first authentication request cannot complete authentication, and the first authentication interface corresponding to the first authentication request cannot obtain a returned authentication result. For another example, the system authentication service in the example is a face recognition service. When the face recognition service has responded to the first authentication request and is in an operating state of being authenticated, after receiving the second authentication request, the face recognition service does not respond to the second authentication request and is still in the original operating state of performing authentication processing on the first authentication request. As a result, the second authentication request cannot be responded, and the second authentication interface corresponding to the second authentication request cannot obtain a returned authentication result.

It may be understood that the electronic device 100 may be used by one or more users. Therefore, the electronic device 100 may also store authentication information templates of a plurality of users. After obtaining authentication information by using the collection module, comparison between the authentication information and the prestored authentication information templates is performed for authentication, to generate a corresponding authentication result.

Figure 13:
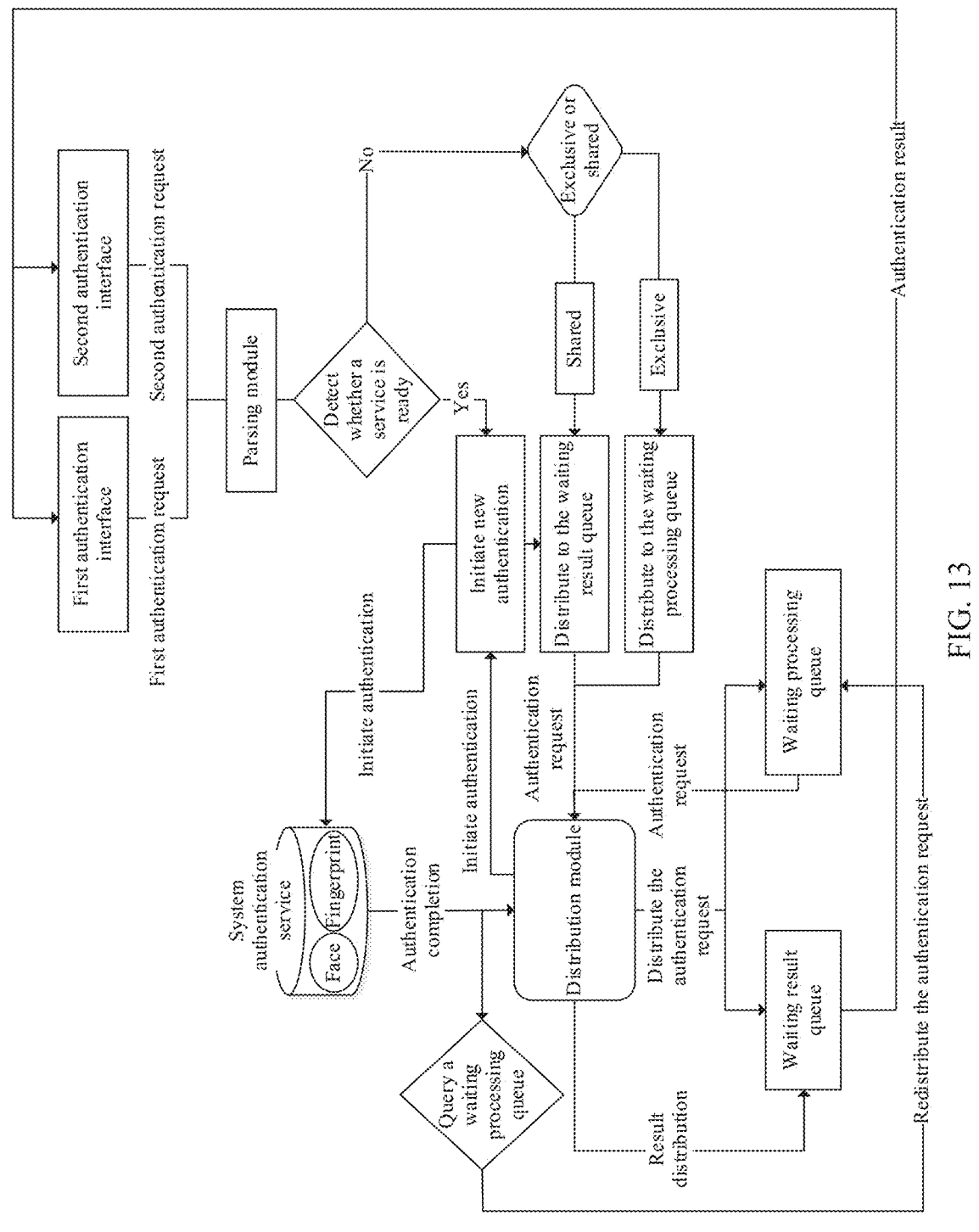
FIG. 13 is a flowchart of an authentication processing module according to an embodiment of this application.

An embodiment of this application provides an authentication processing module having a conflict resolution mechanism. The authentication processing module can process authentication requests initiated by one or more authentication interfaces. The following describes the authentication processing module according to this embodiment of this application. As shown in FIG. 13, FIG. 13 is a flowchart of the authentication processing module according to this embodiment of this application.

In response to accessing a first authentication interface and a second authentication interface, the first authentication interface and the second authentication interface respectively send a first authentication request and a second authentication request to a parsing module. The parsing module is configured to parse an identifier carried in an authentication request, where the identifier may include an authentication page type, a biometric feature authentication type, or the like. In addition, the parsing module adds a policy label after determining an authentication distribution policy of the first authentication request based on the related identifier, where the policy label may be shared, exclusive, or the like.

It should be noted that the policy label may be added through the foregoing analysis of the parsing module, or may be a customized portal opened to the user on an electronic device, and the user defines different policy labels for different applications or authentication interfaces.

Then, it is detected whether an authentication service corresponding to an authentication type of an authentication request is ready. A system authentication service may include a fingerprint authentication service, a face recognition service, or the like. For example, if the authentication type of the authentication request is fingerprint authentication, a status of the fingerprint authentication service is detected. If the status of the fingerprint authentication service is an idle state, a distribution module distributes the authentication request to a waiting result queue, and initiates authentication to the fingerprint authentication service. If the status of the fingerprint authentication service is an operating state, the distribution module sends the authentication request to a corresponding waiting queue based on a distribution policy. For example, if a "shared" label is identified, a corresponding authentication request is sent to the waiting result queue; or if an "exclusive" label is identified, a corresponding authentication request is sent to a waiting processing queue.

After it is detected that a service corresponding to the system authentication service completes authentication, on one hand, the distribution module obtains an authentication result, and distributes the authentication result to the waiting result queue. The authentication request previously distributed to the waiting result queue may reuse the authentication result, and return the authentication result to a corresponding authentication interface. On the other hand, the distribution module queries the authentication request in the waiting processing queue, redistributes the authentication request in the waiting processing queue to the waiting result queue, and initiates authentication to the service corresponding to the system authentication service.

In the parsing module of the authentication processing module, for example, if an authentication page type corresponding to the authentication request is an application startup page, an authentication page corresponding to the application startup page is first displayed before the application startup page is displayed, and then the application startup page is displayed only after authentication succeeds. The application startup interface may be a startup interface (Launch/Splash Screen) of an application that runs in the foreground for the first time, that is, an interface with content displayed in a process in which the application is started from a desktop or an application drawer. After such an application startup page is displayed, privacy information or property security of a user is usually not involved. In this case, a "shared" distribution policy label may be added, by using the parsing module, to an authentication request corresponding to an authentication page. The "shared" distribution policy means that when a plurality of authentication requests of a same biometric feature authentication type are concurrent, the authentication request with the "shared" label may reuse an authentication result of a previous authentication request. Therefore, the electronic device can return authentication results to a plurality of authentication requests by performing authentication processing once, to avoid a request conflict problem and reduce power consumption. In addition, because authentication information is a biometric feature of a user, complex authentication operations can be reduced while relatively high security and privacy are ensured, so that interaction experience of the user is optimized.

For example, an authentication page type corresponding to an authentication request is a payment confirmation page. That is, in some applications having a fund settlement function, after the user selects some funds or a specific commodity, an application displays the payment confirmation page, and performs current payment after authentication succeeds. After execution of such a payment confirmation page is confirmed, if an account balance of the user meets a transaction amount, an actual fund transfer occurs. Therefore, compared with convenience of an interaction operation, a higher security requirement is imposed. In this case, an "exclusive" distribution policy label may be added, by using the parsing module, to an authentication request corresponding to an authentication page. The "exclusive" distribution policy means that when a plurality of authentication requests of a same biometric feature authentication type are concurrent, the authentication request with the "exclusive" label is distributed by the distribution module to the waiting processing queue. After a corresponding authentication service completes authentication, the distribution module obtains the authentication request from the waiting processing queue, and then initiates authentication to the corresponding authentication service. Therefore, the electronic device avoids a request conflict problem, and security of a payment operation of the user is improved.

In some other embodiments, the parsing module may further analyze an interface attribute of an authentication interface, where the interface attribute may include attributes such as an appearance style, a width and height attribute, a display direction, a location, and brightness of the interface. A split-screen mode of a mobile phone is used as an example. When the mobile phone is in a portrait state, an authentication interface may be displayed above the display. The authentication interface is located in an upper area of a screen of the mobile phone, and a height varies based on a boundary of screen splitting. Therefore, after the user accesses the authentication interface, a display module may perform related display adjustment based on a distribution policy of an authentication request or a location of the collection module of an authentication service.

FIG. 14A(1) and FIG. 14A(2) provide a sequence diagram of an application lock authentication method based on a "sharing" policy. Both a first application and a second application are locked applications, and an application lock type is biometric feature authentication (for example, fingerprint authentication, face recognition, voiceprint authentication, or iris recognition). After the first application and the second application are started, a first authentication interface and a second authentication interface are separately displayed by using a system display module.

Further, the first authentication interface sends a first authentication request to a parsing module, and the parsing module parses an identifier carried in the first authentication request, where the identifier may include an authentication page type, a biometric feature authentication type, an interface attribute, or the like. In addition, the parsing module adds a policy label after determining an authentication distribution policy of the first authentication request based on the related identifier.

For example, if the first application is "Gallery", an authentication page type of the first application is an application startup interface, and a biometric feature authentication type is fingerprint authentication, the parsing module determines that a distribution policy corresponding to the first authentication request is "shared". Then, the parsing module sends, to a distribution module, the first authentication request that carries the "shared" policy label. The distribution module detects, by using an authentication module, a working status of a fingerprint authentication service in a system authentication service based on the fact that the biometric feature authentication type corresponding to the first authentication request is fingerprint authentication. If a status of the fingerprint authentication service is an idle state, the distribution module initiates authentication to the fingerprint authentication service by using the authentication module, and distributes the first authentication request to a waiting result queue. The authentication module may detect or invoke a corresponding service in the system authentication service based on an authentication type of an authentication request.

In an authentication processing process of the fingerprint authentication service, the second authentication interface of the second application initiates a second authentication request. For example, if the second application is "Contacts", an authentication page type of the first application is an application startup interface, and a biometric feature authentication type is fingerprint authentication, the parsing module determines that a distribution policy corresponding to the second authentication request is "shared". Then, the parsing module sends, to a distribution module, the second authentication request that carries the "shared" policy label. The distribution module detects, by using an authentication module, a working status of a fingerprint authentication service in a system authentication service based on the fact that the biometric feature authentication type corresponding to the second authentication request is fingerprint authentication. If a status of the fingerprint authentication service is an operating state, the distribution module sends the second authentication request to the waiting result queue.

After fingerprint authentication is enabled, a fingerprint of a user is actively collected. Specifically, the fingerprint may be collected in two manners. One manner is to collect the fingerprint by using a dedicated fingerprint obtainer, and the other manner is to collect the fingerprint by using a screen of a mobile terminal. A location of a fingerprint obtainer of a mobile terminal varies based on a model of the mobile terminal. A screen of a mobile phone of a specific model may be considered as a screen fingerprint obtainer, and the user may touch the screen of the mobile terminal to directly collect the fingerprint of the user. The fingerprint of the user is collected by touching the screen, which is more secret.

If collected fingerprint information of a finger of the user matches a stored fingerprint information template (that is, fingerprint authentication succeeds), an authentication result is "authentication succeeds" or "true". If collected fingerprint information of a finger of the user does not match a stored fingerprint information template (that is, fingerprint authentication fails), an authentication result is "authentication fails" or "false".

After completing authentication, the fingerprint authentication service returns an authentication completion message to the authentication module, and the authentication module sends, to the distribution module, an authentication result corresponding to the first authentication request. Further, after receiving the authentication result, the distribution module queries authentication requests in the waiting result queue to obtain the first authentication request and the second authentication request, and then distributes results of the first authentication request and the second authentication request. Because both the second authentication request and the first authentication request are in the waiting result queue, the second authentication request may reuse the authentication result of the first authentication request. Then, the distribution module sends the authentication result of the first authentication request to the first authentication interface, and sends the authentication result of the second authentication request to the second authentication interface. For example, if the authentication result of the first authentication request is "authentication succeeds" or "true", both the first application and the second application may be unlocked after the result is returned, that is, an application lock module exits management and control, cancels authentication interfaces, and then displays corresponding application interfaces.

FIG. 14B(1) and FIG. 14B(2) provide a sequence diagram of an application lock authentication method based on an "exclusive" policy. Both a first application and a second application are locked applications, and an application lock type is biometric feature authentication (for example, fingerprint authentication, face recognition, voiceprint authentication, or iris recognition). After the first application and the second application are started, a first authentication interface and a second authentication interface are separately displayed by using a system display module.

Further, the first authentication interface sends a first authentication request to a parsing module, and the parsing module parses an identifier carried in the first authentication request, where the identifier may include an authentication page type, a biometric feature authentication type, an interface attribute, or the like. In addition, the parsing module adds a policy label after determining an authentication distribution policy of the first authentication request based on the related identifier.

For example, if the first application is "Gallery", an authentication page type of the first application is an application startup interface, and a biometric feature authentication type is fingerprint authentication, the parsing module determines that a distribution policy corresponding to the first authentication request is "shared". Then, the parsing module sends, to a distribution module, the first authentication request that carries the "shared" policy label. The distribution module detects, by using an authentication module, a working status of a fingerprint authentication service in a system authentication service based on the fact that the biometric feature authentication type corresponding to the first authentication request is fingerprint authentication. If a status of the fingerprint authentication service is an idle state, the distribution module initiates authentication to the fingerprint authentication service by using the authentication module, and distributes the first authentication request to a waiting result queue. The authentication module may detect or invoke a corresponding service in the system authentication service based on an authentication type of an authentication request.

In an authentication processing process of the fingerprint authentication service, the second authentication interface of the second application initiates a second authentication request. For example, if the second application is "Digital wallet", an authentication page type of the first application is a payment confirmation interface, and a biometric feature authentication type is fingerprint authentication, the parsing module determines that a distribution policy corresponding to the second authentication request is "exclusive". Then, the parsing module sends, to a distribution module, the second authentication request that carries the "exclusive" policy label. The distribution module detects, by using an authentication module, a working status of a fingerprint authentication service in a system authentication service based on the fact that the biometric feature authentication type corresponding to the second authentication request is fingerprint authentication. If a status of the fingerprint authentication service is an operating state, the distribution module sends the second authentication request to a waiting processing queue.

After fingerprint authentication is enabled, a fingerprint of a user is actively collected. Specifically, the fingerprint may be collected in two manners. One manner is to collect the fingerprint by using a dedicated fingerprint obtainer, and the other manner is to collect the fingerprint by using a screen of a mobile terminal. A location of a fingerprint obtainer of a mobile terminal varies based on a model of the mobile terminal. A screen of a mobile phone of a specific model may be considered as a screen fingerprint obtainer, and the user may touch the screen of the mobile terminal to directly collect the fingerprint of the user. The fingerprint of the user is collected by touching the screen, which is more secret.

If collected fingerprint information of a finger of the user matches a stored fingerprint information template (that is, fingerprint authentication succeeds), an authentication result is "authentication succeeds" or "true". If collected fingerprint information of a finger of the user does not match a stored fingerprint information template (that is, fingerprint authentication fails), an authentication result is "authentication fails" or "false".

After completing authentication, the fingerprint authentication service returns an authentication completion message to the authentication module, and the authentication module sends, to the distribution module, an authentication result corresponding to the first authentication request. The distribution module queries authentication requests in the waiting result queue to obtain the first authentication request, and then sends the authentication result of the first authentication request to the first authentication interface; and queries authentication requests in the waiting processing queue to obtain the second authentication request, then distributes the second authentication request to the waiting result queue, and initiates authentication to the fingerprint authentication service by using the authentication module.

In some embodiments, when the fingerprint authentication service is in an operating state, the distribution module may further receive a third authentication request. In this case, the distribution module only needs to determine, based on a distribution policy of the third authentication request, whether to reuse a returned result of the current fingerprint authentication service. For example, if the distribution policy of the third authentication request is "shared", the distribution module distributes the third authentication request to the waiting result queue, and reuses an obtained authentication result after a fingerprint service completes authentication, that is, sends the authentication result to an authentication interface that initiates the third authentication request. For another example, if the distribution policy of the third authentication request is "exclusive", the distribution module distributes the third authentication request to the waiting processing queue. After a fingerprint service completes authentication, the distribution module distributes the third authentication request to the waiting result queue and initiates authentication to the fingerprint authentication service. After the fingerprint authentication service completes the authentication, the distribution module sends an authentication result to an interface that initiates the third authentication request.

In some embodiments, the authentication processing module may have no parsing module. It is assumed that when a plurality of authentication requests with a same biometric feature authentication type or different biometric feature authentication types are initiated, a next authentication request may reuse an authentication result of a previous authentication request.

FIG. 15 is a flowchart of a display method applied to an electronic device according to an embodiment of this application. The method includes the following steps.

S1001: Display a first authentication interface in response to accessing a first application on the electronic device by a user.

For example, the user may tap an icon of the first application on a home screen of the electronic device to access the first application; or may tap a thumbnail of the first application on a multi-task interface of the electronic device to access the first application; or may tap a split-screen control of the first application on a multi-task interface of the electronic device to access the first application in a split-screen mode. In the split-screen mode, the first authentication interface may be located in a first display area of the electronic device.

It is assumed that the first application is a locked application. Specifically, whether the first application has been written into a locked list of an application lock may be queried by using an index database in a system. If a second application is found, it is determined that the first application is the locked application. An authentication type of the application lock may be one or more of biometric feature authentication, for example, fingerprint authentication, face recognition, voiceprint authentication, or iris authentication.

Because the first application is the locked application, the electronic device displays the first authentication interface. The first authentication interface may be used to prompt the user to enter corresponding authentication information, for example, "Access the first application by using a fingerprint, and touch a sensing area".

S1002: Display a second authentication interface in response to accessing a second application on the electronic device by the user.

For example, in the split-screen mode, a display area of the electronic device includes a first display area and a second display area. The first display area of the electronic device displays the first authentication interface. The user may tap an icon of the second application in the second display area of the electronic device to access the second application.

It is assumed that the second application is a locked application. Specifically, whether the second application has been written into a locked list of an application lock may be queried by using an index database in a system. If the second application is found, it is determined that the second application is the locked application. An authentication type of the application lock may be one or more of biometric feature authentication, for example, fingerprint authentication, face recognition, voiceprint authentication, or iris authentication.

Because the second application is the locked application, the electronic device displays a second authentication interface. The second authentication interface may be used to prompt the user to enter corresponding authentication information, for example, "Access the second application by using a fingerprint, and touch a sensing area".

S1003: Obtain first authentication information of the user based on information about a first authentication request initiated by the first authentication interface.

Specifically, the first authentication interface may send the information about the first authentication request to an authentication processing module, where the authentication processing module may include a parsing module. The parsing module is configured to parse an identifier carried in the information about the first authentication request, where the identifier may include an authentication page type, a biometric feature authentication type, or the like. In addition, the parsing module adds a policy label after determining an authentication distribution policy of the first authentication request based on the related identifier, where the policy label may be "shared", "exclusive", or the like.

It may be understood that the policy label may be added through the foregoing analysis of the parsing module, or an algorithm corresponding to the shared or exclusive policy label may be preset without additional analysis and label adding, or a customized portal developed for the user on the electronic device, and the user defines different policy labels for different applications or authentication interfaces.

Then, it is detected whether an authentication service corresponding to an authentication type of the information about the first authentication request is ready. A system authentication service may include a fingerprint authentication service, a face recognition service, or the like. The authentication service corresponding to the information about the first authentication request is invoked, and the authentication service starts a collection module to obtain the first authentication information of the user by using the collection module. For example, if the authentication type of the information about the first authentication request is fingerprint authentication, the authentication processing module may detect a status of the fingerprint authentication service by using the authentication module. If the status of the fingerprint authentication service is an idle state, authentication is initiated to the fingerprint authentication service, and the fingerprint authentication service invokes the collection module.

It should be noted that different authentication services are invoked based on authentication types corresponding to information about authentication requests, to obtain different authentication information. When an authentication type corresponding to information about an authentication request is fingerprint authentication, the authentication information may be fingerprint information: when an authentication type corresponding to information about an authentication request is face recognition, the authentication information may be face information; when an authentication type corresponding to information about an authentication request is iris authentication, the authentication information may be iris information; or when an authentication type corresponding to information about an authentication request is voiceprint authentication, the authentication information may be voiceprint information.

S1004: Generate a first authentication result based on the first authentication information.

Specifically, for example, the first authentication information is fingerprint information. After fingerprint authentication is enabled, a fingerprint of the user is actively collected. The fingerprint may be collected in two manners. One manner is to collect the fingerprint by using a dedicated fingerprint obtainer, and the other manner is to collect the fingerprint by using a screen of a mobile terminal. A location of a fingerprint obtainer of a mobile terminal varies based on a model of the mobile terminal. A screen of a mobile phone of a specific model may be considered as a screen fingerprint obtainer, and the user may touch the screen of the mobile terminal to directly collect the fingerprint of the user. The fingerprint of the user is collected by touching the screen, which is more secret.

If collected fingerprint information of a finger of the user matches a stored fingerprint information template (that is, fingerprint authentication succeeds), the first authentication result is "authentication succeeds" or "true".

S1005: Display a first application interface.

Specifically, after generating the first authentication result based on the first authentication information, the system authentication service sends the first authentication result to the first authentication interface by using the distribution module. If an authentication result of the first authentication request is "authentication succeeds" or "true", an application lock module exits management and control, cancels the first authentication interface, and displays the first application interface by using a display module.

S1006: Display a second application interface.

Specifically, after generating the first authentication result based on the first authentication information, the system authentication service sends the first authentication result to the second authentication interface by using the distribution module. If an authentication result of the first authentication request is "authentication succeeds" or "true", an application lock module exits management and control, cancels the first authentication interface, and displays the second application interface by using a display module.

FIG. 16 is a flowchart of another display method applied to an electronic device according to an embodiment of this application. The method includes the following steps.

S1011: Display a first authentication interface in response to accessing a first application on the electronic device by a user.

For example, the user may tap an icon of the first application on a home screen of the electronic device to access the first application; or may tap a thumbnail of the first application on a multi-task interface of the electronic device to access the first application; or may tap a split-screen control of the first application on a multi-task interface of the electronic device to access the first application in a split-screen mode. In the split-screen mode, the first authentication interface may be located in a first display area of the electronic device.

It is assumed that the first application is a locked application. Specifically, whether the first application has been written into a locked list of an application lock may be queried by using an index database in a system. If a second application is found, it is determined that the first application is the locked application. An authentication type of the application lock may be one or more of biometric feature authentication, for example, fingerprint authentication, face recognition, voiceprint authentication, or iris authentication.

Because the first application is the locked application, the electronic device displays the first authentication interface. The first authentication interface may be used to prompt the user to enter corresponding authentication information, for example, "Access the first application by using a fingerprint, and touch a sensing area".

S1012: Display a second authentication interface in response to accessing a second application on the electronic device by the user.

For example, in the split-screen mode, a display area of the electronic device includes a first display area and a second display area. The first display area of the electronic device displays the first authentication interface. The user may tap an icon of the second application in the second display area of the electronic device to access the second application.

It is assumed that the second application is a locked application. Specifically, whether the second application has been written into a locked list of an application lock may be queried by using an index database in a system. If the second application is found, it is determined that the second application is the locked application. An authentication type of the application lock may be one or more of biometric feature authentication, for example, fingerprint authentication, face recognition, voiceprint authentication, or iris authentication.

Because the second application is the locked application, the electronic device displays a second authentication interface. The second authentication interface may be used to prompt the user to enter corresponding authentication information, for example, "Access the second application by using a fingerprint, and touch a sensing area".

S1013: Obtain first authentication information of the user based on information about a first authentication request initiated by the first authentication interface.

Specifically, the first authentication interface may send the information about the first authentication request to an authentication processing module, where the authentication processing module may include a parsing module. The parsing module is configured to parse an identifier carried in the information about the first authentication request, where the identifier may include an authentication page type, a biometric feature authentication type, or the like. In addition, the parsing module adds a policy label after determining an authentication distribution policy of the first authentication request based on the related identifier, where the policy label may be "shared", "exclusive", or the like.

It may be understood that the policy label may be added through the foregoing analysis of the parsing module, or an algorithm corresponding to the shared or exclusive policy label may be preset without additional analysis and label adding, or a customized portal developed for the user on the electronic device, and the user defines different policy labels for different applications or authentication interfaces.

Then, it is detected whether an authentication service corresponding to an authentication type of the information about the first authentication request is ready. A system authentication service may include a fingerprint authentication service, a face recognition service, or the like. The authentication service corresponding to the information about the first authentication request is invoked, and the authentication service starts a collection module to obtain the first authentication information of the user by using the collection module. For example, if the authentication type of the information about the first authentication request is fingerprint authentication, the authentication processing module may detect a status of the fingerprint authentication service by using the authentication module. If the status of the fingerprint authentication service is an idle state, authentication is initiated to the fingerprint authentication service, and the fingerprint authentication service invokes the collection module.

It should be noted that different authentication services are invoked based on authentication types corresponding to information about authentication requests, to obtain different authentication information. When an authentication type corresponding to information about an authentication request is fingerprint authentication, the authentication information may be fingerprint information; when an authentication type corresponding to information about an authentication request is face recognition, the authentication information may be face information: when an authentication type corresponding to information about an authentication request is iris authentication, the authentication information may be iris information; or when an authentication type corresponding to information about an authentication request is voiceprint authentication, the authentication information may be voiceprint information.

S1014: Generate a first authentication result based on the first authentication information.

Specifically, for example, the first authentication information is fingerprint information. After fingerprint authentication is enabled, a fingerprint of the user is actively collected. The fingerprint may be collected in two manners. One manner is to collect the fingerprint by using a dedicated fingerprint obtainer, and the other manner is to collect the fingerprint by using a screen of a mobile terminal. A location of a fingerprint obtainer of a mobile terminal varies based on a model of the mobile terminal. A screen of a mobile phone of a specific model may be considered as a screen fingerprint obtainer, and the user may touch the screen of the mobile terminal to directly collect the fingerprint of the user. The fingerprint of the user is collected by touching the screen, which is more secret.

If collected fingerprint information of a finger of the user matches a stored fingerprint information template (that is, fingerprint authentication succeeds), the first authentication result is "authentication succeeds" or "true".

S1015: Obtain second authentication information of the user based on information about a second authentication request initiated by the second authentication interface.

Specifically, the second authentication interface may send the information about the second authentication request to an authentication processing module, where the authentication processing module may include a parsing module. The parsing module is configured to parse an identifier carried in the information about the first authentication request, where the identifier may include an authentication page type, a biometric feature authentication type, or the like. In addition, the parsing module may add a policy label after determining an authentication distribution policy of the second authentication request based on the related identifier, where the policy label may be "shared", "exclusive", or the like.

It may be understood that the policy label may be added through the foregoing analysis of the parsing module, or an algorithm corresponding to the shared or exclusive policy label may be preset without additional analysis and label adding, or a customized portal developed for the user on the electronic device, and the user defines different policy labels for different applications or authentication interfaces.

Then, it is detected whether an authentication service corresponding to an authentication type of the information about the second authentication request is ready. A system authentication service may include a fingerprint authentication service, a face recognition service, or the like. In one case, if an initiation moment of the second authentication request is the same as or adjacent to that of the first authentication request, an authentication type of the second authentication request is the same as that of the first authentication request, and an authentication service corresponding to the authentication type is, based on the first authentication request, in an operating state of being authenticated, the second authentication request is placed in a waiting queue by using the distribution module. After the authentication service completes authentication on the first authentication request, the second authentication request may reuse the authentication result of the first authentication request (refer to the descriptions in S1006), or may initiate authentication to the authentication service, to obtain the second authentication information of the user by using the authentication service.

It should be noted that different authentication services are invoked based on authentication types corresponding to information about authentication requests, to obtain different authentication information. When an authentication type corresponding to information about an authentication request is fingerprint authentication, the authentication information may be fingerprint information; when an authentication type corresponding to information about an authentication request is face recognition, the authentication information may be face information: when an authentication type corresponding to information about an authentication request is iris authentication, the authentication information may be iris information; or when an authentication type corresponding to information about an authentication request is voiceprint authentication, the authentication information may be voiceprint information.

S1016: Generate a second authentication result based on the second authentication information.

Specifically, for example, the second authentication information is fingerprint information. After fingerprint authentication is enabled, a fingerprint of the user is actively collected. The fingerprint may be collected in two manners. One manner is to collect the fingerprint by using a dedicated fingerprint obtainer, and the other manner is to collect the fingerprint by using a screen of a mobile terminal. A location of a fingerprint obtainer of a mobile terminal varies based on a model of the mobile terminal. A screen of a mobile phone of a specific model may be considered as a screen fingerprint obtainer, and the user may touch the screen of the mobile terminal to directly collect the fingerprint of the user. The fingerprint of the user is collected by touching the screen, which is more secret.

If collected fingerprint information of the finger of the user matches a stored fingerprint information template (that is, fingerprint authentication succeeds), the second authentication result is "authentication succeeds" or "true".

S1017: Display a first application interface.

Specifically, after generating the first authentication result based on the first authentication information, the system authentication service sends the first authentication result to the first authentication interface by using the distribution module. If an authentication result of the first authentication request is "authentication succeeds" or "true", an application lock exits management and control, cancels the first authentication interface, and starts to display the first application interface by using a display module.

S1018: Display a second application interface.

Specifically, after generating the second authentication result based on the second authentication information, the system authentication service sends the second authentication result to the second authentication interface by using the distribution module. If an authentication result of the second authentication request is "authentication succeeds" or "true", an application lock module exits management and control, cancels the first authentication interface, and displays the second application interface by using a display module.

FIG. 15 and FIG. 16 each are a flowchart of a display method that is applied to an electronic device and that is obtained according to some embodiments.

It should be understood that a specific order of describing the operations in FIG. 15 and FIG. 16 is merely an example, and is not intended to indicate that the order is the only order in which the operations can be performed. A person of ordinary skill in the art may learn various manners of reordering the operations described in this specification. In addition, it should be noted that details about other methods or processes described in this specification are also applicable in a similar manner to the methods described above with reference to FIG. 15 and FIG. 16. For the purpose of brevity, details are not described herein again.

According to the context, the term "when" used in the foregoing embodiments may be interpreted as a meaning of "if", "after", "in response to determining", or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a random access memory RAM, a magnetic disk, or an optical disc.

What is claimed is:

1. A method comprising:
displaying, in response to accessing a first application on an electronic device by a user, a first authentication interface instructing the user to perform first biometric feature authentication;
displaying, while displaying the first authentication interface and in response to accessing a second application on the electronic device by the user, a second authentication interface instructing the user to perform second biometric feature authentication, wherein both the first application and the second application are locked applications, and wherein the second authentication interface covers a part of the first authentication interface in a form of a floating window;
obtaining first biometric authentication information of the user;
displaying, in response to first successful authentication on the first biometric authentication information, a first application interface comprising first content of the first application;
obtaining second biometric authentication information of the user; and
simultaneously displaying, while displaying the first application interface and in response to second successful authentication on the second biometric authentication information, a second application interface comprising second content of the second application.

2. The method of claim 1, further comprising displaying the first authentication interface and the second authentication interface in a split-screen mode.

3. The method of claim 1, further comprising:
further displaying the first authentication interface in a first display area; and
further displaying the second authentication interface in a second display area.

4. The method of claim 1, wherein the first authentication interface comprises a first control, and wherein the method further comprises enabling a system authentication service in response to a user input acting on the first control.

5. The method of claim 1, further comprising displaying the second application interface comprising the second content of the second application after authentication on the first biometric authentication information succeeds.

6. The method of claim 1, wherein the second biometric authentication information comprises voiceprint information.

7. The method of claim 1, wherein a first biometric feature authentication type of the first biometric authentication information is the same as a second biometric feature authentication type of the second biometric authentication information of the user.

8. The method of claim 1, wherein the first biometric authentication information is fingerprint information, face information, iris information, or voiceprint information.

9. The method of claim 6, wherein the second biometric authentication information further comprises fingerprint information.

10. The method of claim 1, wherein obtaining the first biometric authentication information comprises obtaining the first biometric authentication information from another electronic device communicatively coupled to the electronic device.

11. An electronic device, comprising:
a memory configured to store instructions; and
a processor coupled to the memory and configured to:
display, in response to accessing a first application on the electronic device by a user, a first authentication interface instructing the user to perform first biometric feature authentication;
display, while displaying the first authentication interface and in response to accessing a second application on the electronic device by the user, a second authentication interface instructing the user to perform second biometric feature authentication, wherein both the first application and the second application are locked applications, and wherein the second authentication interface covers a part of the first authentication interface in a form of a floating window;
obtain first biometric authentication information of the user;
display, in response to first successful authentication on the first biometric authentication information, a first application interface comprising first content of the first application;
obtain second biometric authentication information of the user; and
simultaneously display, while displaying the first application interface and in response to second successful authentication on the second biometric authentication information, a second application interface comprising second content of the second application.

12. The electronic device of claim 11, wherein the processor is further configured to display the first authentication interface and the second authentication interface in a split-screen mode.

13. The electronic device of claim 11, wherein the processor is further configured to display the first authentication interface in a first display area and the second authentication interface in a second display area.

14. The electronic device of claim 11, wherein the first authentication interface comprises a first control, and wherein the processor is further configured to enable a system authentication service in response to a user input acting on the first control.

15. The electronic device of claim 11, wherein the processor is further configured to display the second application interface comprising the second content of the second application after authentication on the first biometric authentication information succeeds.

16. The electronic device of claim 11, wherein the second biometric authentication information comprises iris information.

17. The electronic device of claim 11, wherein a first biometric feature authentication type of the first biometric authentication information is the same as a second biometric feature authentication type of the second biometric authentication information.

18. The electronic device of claim 16, wherein the second biometric authentication information further comprises fingerprint information.

19. A computer program product comprising computer-executable instructions that are stored on a non-transitory computer-readable storage medium and that, when executed by a processor, cause an electronic device to:

display, in response to accessing a first application on the electronic device by a user, a first authentication interface instructing the user to perform first biometric feature authentication;

display, while displaying the first authentication interface and in response to accessing a second application on the electronic device by the user, a second authentication interface instructing the user to perform second biometric feature authentication, wherein both the first application and the second application are locked applications, and wherein the second authentication interface covers a part of the first authentication interface in a form of a floating window, obtain first biometric authentication information of the user;

display, in response to first successful authentication on the first biometric authentication information, a first application interface comprising first content of the first application;

obtain second biometric authentication information of the user; and display, in response to second successful authentication on the second biometric authentication information, a second application interface comprising second content of the second application.

20. The computer program product of claim 19, wherein a first biometric feature authentication type of the first biometric authentication information is the same as a second biometric feature authentication type of the second biometric authentication information of the user.

21. The computer program product of claim 19, wherein the first biometric authentication information comprises iris information or voiceprint information.

* * * * *